(12) United States Patent
Casagrande et al.

(10) Patent No.: US 11,375,743 B2
(45) Date of Patent: Jul. 5, 2022

(54) TRANSFERRING AND INSPECTING UNIT OF A GROUP OF ELONGATED ELEMENTS

(71) Applicant: G.D S.p.A., Bologna (IT)

(72) Inventors: Alberto Casagrande, Castel Maggiore (IT); Sergio Morelli, Bologna (IT); Luca Federici, Bologna (IT)

(73) Assignee: G.D S.p.A., Bologna (IT)

( * ) Notice: Subject to any disclaimer, the term of this patent is extended or adjusted under 35 U.S.C. 154(b) by 866 days.

(21) Appl. No.: 16/312,626

(22) PCT Filed: Jun. 19, 2017

(86) PCT No.: PCT/IB2017/053621
§ 371 (c)(1),
(2) Date: Dec. 21, 2018

(87) PCT Pub. No.: WO2017/221126
PCT Pub. Date: Dec. 28, 2017

(65) Prior Publication Data
US 2020/0236987 A1    Jul. 30, 2020

(30) Foreign Application Priority Data

Jun. 22, 2016 (IT) .......................... 102016000064367
Jun. 22, 2016 (IT) .......................... 102016000064379

(51) Int. Cl.
*A24C 5/34* (2006.01)
*B65B 19/28* (2006.01)
*G01N 21/952* (2006.01)

(52) U.S. Cl.
CPC ............ *A24C 5/3412* (2013.01); *B65B 19/28* (2013.01); *G01N 21/952* (2013.01)

(58) Field of Classification Search
CPC ..... A24C 5/3412; B65B 19/28; G01N 21/952
See application file for complete search history.

(56) References Cited

U.S. PATENT DOCUMENTS 4,486,098 A    12/1984 Buchegger et al.
4,511,045 A    4/1985 Seragnoli
(Continued)

FOREIGN PATENT DOCUMENTS

CN    35104188 A    11/1986
CN    1038620 A     1/1990
(Continued)

OTHER PUBLICATIONS

Chinese Office Action; U.S. Appl. No. 16/312,626; dated Dec. 3, 2020; 7 Pages.
(Continued)

*Primary Examiner* — Eric Yaary
(74) *Attorney, Agent, or Firm* — Whitmyer IP Group LLC

(57) ABSTRACT

A transferring and inspection unit for transferring and inspecting a group of elongated elements that are rod-shaped for smoking articles that includes a forming pocket, having a longitudinal axis, which is provided with a hollow housing suitable for housing a group of elongated elements to be inspected; a transporting conveyor of the forming pocket which is configured to advance the pocket along an advancing path through a first inspection position; a first tridimensional inspecting optical assembly configured to perform in respective successive scanning instants a plurality of first tridimensional optical scans by projecting a first light blade over a first head face of the group, during advancing of the forming pocket through the first inspection position; a processing device configured to obtain, for each first tridimensional scan, a respective first scanning line associated with the respective scanning instant and to reconstruct a first tridimensional profile of the first head face on the basis of the plurality of the first scanning lines, positioned in respective first reference positions. The forming pocket includes a first front face that in turn includes a first shaped surface be the first optical assembly is configured to perform simultaneously with each first tridimensional scan of the first head face also a respective first tridimensional scan of the first shaped surface to obtain a respective further scanning line; the processing device is in addition configured to calculate the reference position of each first scanning line analyzing the respective further scanning line.

31 Claims, 9 Drawing Sheets

(56) References Cited

U.S. PATENT DOCUMENTS

| | | |
|---|---|---|
| 5,127,737 A | 7/1992 | Neri |
| 6,531,693 B1 | 3/2003 | Focke et al. |
| 2006/0180167 A1 | 8/2006 | Spatafora et al. |
| 2013/0113917 A1 | 5/2013 | Sato |

FOREIGN PATENT DOCUMENTS

| | | | |
|---|---|---|---|
| CN | 1276999 | A | 12/2000 |
| CN | 1280541 | A | 1/2001 |
| CN | 1792287 | A | 6/2006 |
| CN | 101358933 | A | 2/2009 |
| CN | 103300471 | A | 9/2013 |
| CN | 204064961 | U | 12/2014 |
| DE | 4424045 | A1 | 1/1996 |
| DE | 19642793 | A1 | 4/1998 |
| EP | 0634112 | A2 | 1/1995 |
| EP | 812548 | A1 | 12/1997 |
| EP | 1674395 | A1 | 6/2006 |
| EP | 2677273 | A1 | 12/2013 |
| GB | 3304982 | | 3/1983 |
| JP | 2006174835 | A | 7/2006 |
| JP | 2008170279 | A | 7/2008 |
| WO | 2012035608 | A1 | 3/2012 |

OTHER PUBLICATIONS

Japenese Office Action; Application No. 2018-567239; dated Jan. 22, 2021; 3 Pages.

International Search Report & Written Opinion of the International Searching Authority Application No. PCT/IB2017/053621 Completed: Jan. 3, 2018; dated Jan. 11, 2018 23 Pages.

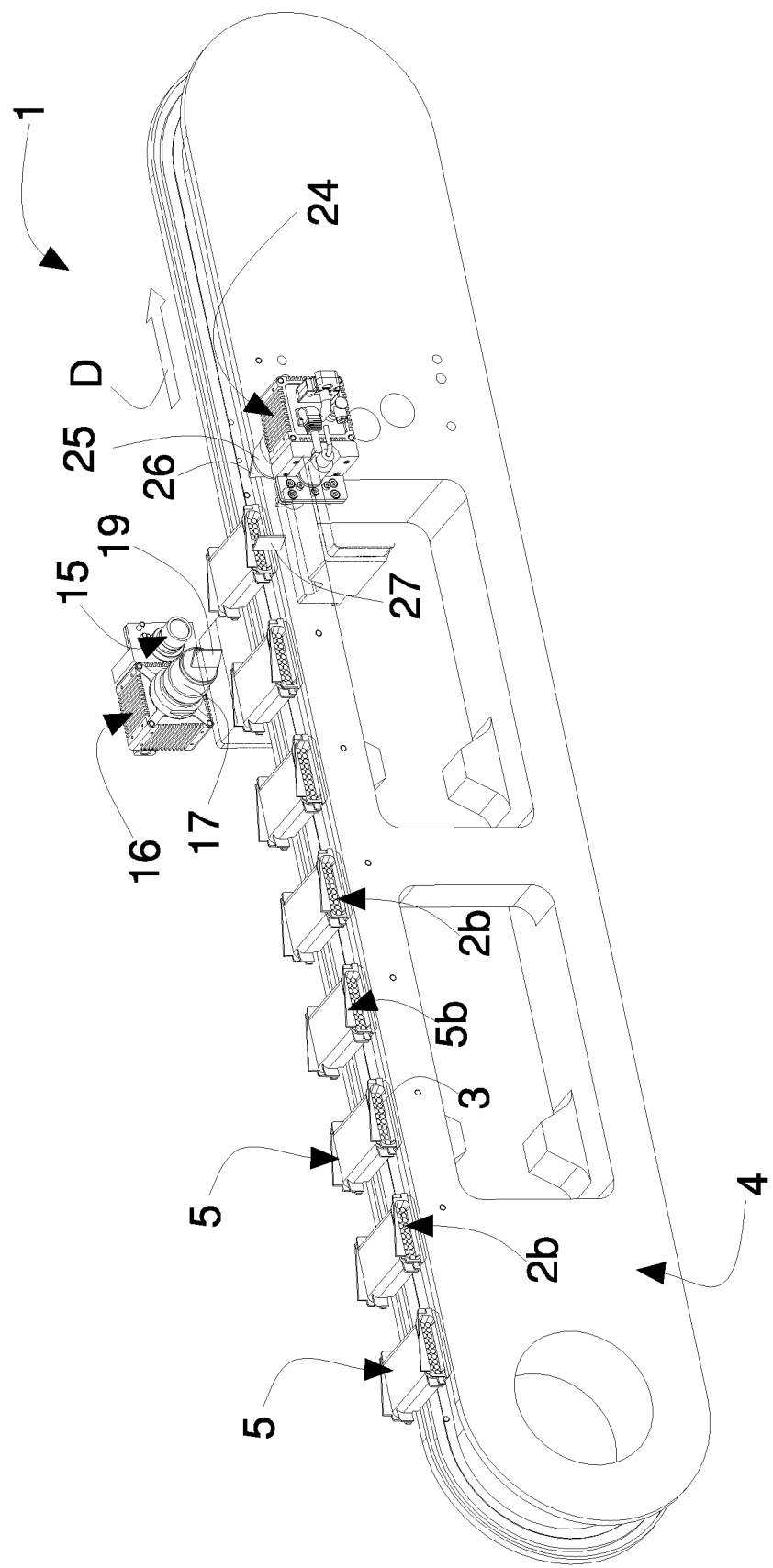

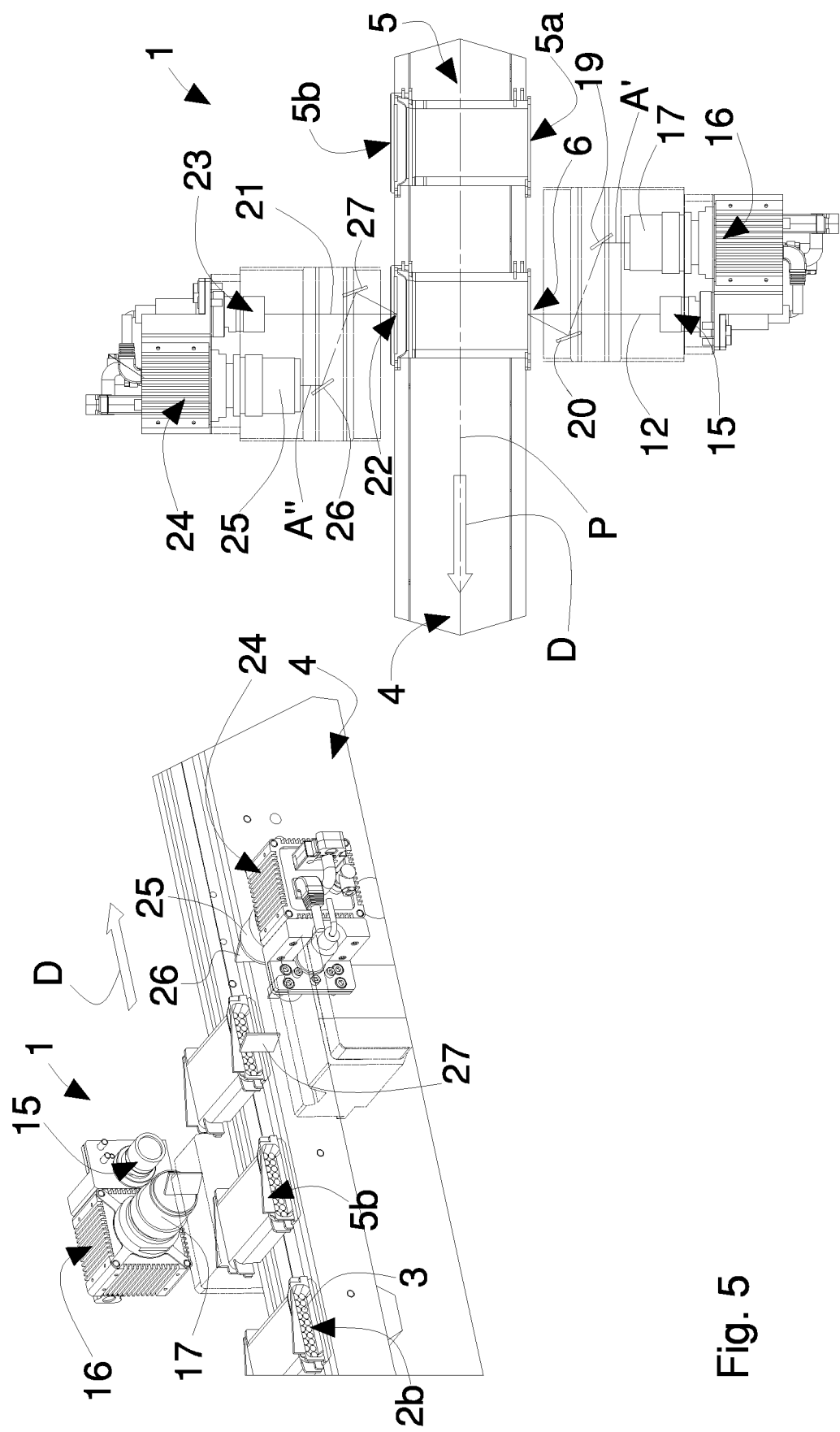

TRANSFERRING AND INSPECTING UNIT OF A GROUP OF ELONGATED ELEMENTS

TECHNICAL FIELD

The present invention relates to a unit for transferring and inspecting a group of elongated, in particular rod-shaped elements, in a machine of the tobacco industry. In particular, the present invention relates to a transferring and inspection unit for transferring and inspecting ends of a group of cigarettes intended to be wrapped in a wrapping line of a packaging machine.

BACKGROUND

To supply groups of cigarettes to a wrapping line of a packaging machine, it is known to house each group in a respective substantially parallelepiped forming pocket, which has internally a vain configured to contain the group. The forming pockets, which are fixed at a constant pitch to a transporting conveyor, are advanced in succession and supplied to the packaging machine.

As is known, the transporting conveyor receives motion from a drive of the packaging machine, or is synchronized therewith, is made as a continuous belt wound as a ring around end rollers, and can advance in an indexed manner or with continuous motion. Both the forming pocket and the cigarettes housed therein that make up each group, are arranged transversely to an advancing direction of the transporting conveyor.

The cigarettes are arranged in superimposed layers and, in the case of groups of twenty cigarettes, can be arranged for example in two superimposed layers of ten cigarettes each or in three superimposed layers according to a quincunx arrangement (two layers of seven cigarettes each, between which a layer of six cigarettes is interposed).

It is frequently the case that within the aforesaid veins there are incomplete groups or groups comprising one or more cigarettes having defective ends, because of insufficient filling with tobacco and/or absence of filter and/or incorrect conformation of the filter, if the filter is of special type and has a particular shape, for example has a recess that has to be of a pre-set shape.

Numerous patent documents show a method and a unit for optically inspecting ends of cigarettes present in a group. The optical inspection of a head face of the group, and i.e. of the ends of the cigarettes making up the group, is in fact performed over the course of advancing of the transporting conveyor. By illuminating by a source of light at least one zone of the head face of the group and by analyzing the light reflected therefrom by an inspection unit, it is possible to determine the geometrical structure of the end of the cigarette and/or of the cigarettes present in the illuminated zone.

U.S. Pat. No. 4,511,045, of the same applicant, shows an inspection unit for inspecting a head face of a group of cigarettes that is housed in a forming pocket, conveyed in an indexed manner by a transporting conveyor in an advancing direction that is perpendicular to the axes of the cigarettes and to the longitudinal axis of the pocket.

The inspection unit comprises an inspection station arranged along an advancing path of the conveyor. The inspection station comprises at least one photocell for each layer of cigarettes present in the group, for example comprises three photocells, and is made as a plate, that lies on a perpendicular plane to the axes of the cigarettes, to which the three photocells are fixed superimposed on one another. Each photocell is configured to emit a light beam to the end of a cigarette and to analyze a beam reflected by its end, the intensity of which depends on the distance between the end of the cigarette and the emitter.

Therefore the inspection of the entire head face of the group is made through successive inspections of portions of the group when the group of cigarettes is waiting between two successive advancing steps, in correspondence of the inspection station. The portion of the head face of the inspected group is the portion arranged frontally to the inspection station at the scanning instant, for example an inspection is performed of just one cigarette per layer for each scan. Each inspection is synchronized with a cyclical advancing signal that provides, for each inspection instant, the respective advancing position of the forming pocket in the advancing path, with respect to the inspection station, so as to enable the entire head face of the group of cigarettes to be reconstructed correctly. In other words, the cyclical advancing signals are cyclical signals coming from a controller of the packaging machine in relation to positions of a shaft of the machine, the shaft being connected mechanically to the transporting conveyor of the forming pocket. Nevertheless, preferably, the cyclical advancing signals are obtained not from the main shaft of the packaging machine but from an additional encoder, which is high precision, positioned on the transporting conveyor of the forming pocket, configured to emit cyclical advancing signals at the requested frequency.

A method and a unit for optical inspection of an end of a cigarette are also known from EP0634112, of the same applicant, which provides using an optical assembly for the tridimensional scan.

An optical assembly for the tridimensional scan is based on the principle that if a light blade illuminates a surface, the reflected luminous trace is a segment of a straight line if the illuminated surface is flat; it is a portion of curved line, in the presence of concavity or convexity; it is a broken line, in the presence of a corner. If the surface illuminated by the light blade is a surface in space, the reflected luminous trace is a mixed broken line, with rectilinear segments, curved portions and broken lines.

EP0634112 provides projecting a light blade onto the end containing tobacco to obtain a light trace that, if filling is optimum, it appears a substantially straight profile line in an image acquired from an image acquisition optical apparatus, configured for a tridimensional profile. The end points of the line correspond to intersection points between the light blade and the outer wrapper of the cigarette. If the end of the cigarette is filled in insufficiently and is partially empty, the light trace in the tobacco appears in the acquired image as a curved line, or as an interrupted curved line. By processing the image and by analyzing the distance between the identified curved line and an ideal theoretical straight line, it is possible to establish whether the inspected cigarette is of acceptable quality or is to be rejected and it is in other words possible to determine whether the tip of the cigarette is empty. Further, by performing in succession a plurality of tridimensional scans by blades of light that are parallel to one another, it is possible to obtain a plurality of respective profile lines with which to reconstruct precisely a tridimensional profile of the end of the inspected cigarette.

The expression "image acquisition optical apparatus" means an optoelectronic image acquisition apparatus, which is able to acquire images of an object, and in particular process these images so as to extract therefrom features of interest, for example geometrical and/or shape features of such object. The acquired images can be color or black and white images and from such images information on the color can be extracted (tone, saturation, etc.) or respectively on the level of grey, and on light intensity.

The optical apparatus usually comprises a body on which an electronic sensor is arranged, for example an alignment or array of photosensitive elements of linear or bidimensional matrix type, for example of the CCD or CMOS type, and optical reception means appropriately fixed to the body, for example an objective made up of one or more lenses, by means of which the sensor is suitable for receiving the light to be acquired diffused by the object.

The number of pixels or of the dot-shaped elements that make up the representation of a raster or bitmap image in the memory of the optical apparatus corresponds to the number of photosensitive elements of the electronic sensor. It should be noted that an image with resolution of (n*m) pixels can be obtained with a single acquisition with the use of a bidimensional or matrix sensor, of (n*m) photosensitive elements.

A control device is comprised in an optical apparatus for commanding the acquisition of the image, the switching on of an illuminator that is possibly associated with the optical apparatus, and also, in some applications, for processing the acquired image in order to extract features of interest from the image itself and to communicate the result of the optical inspection to an outer control apparatus. Optical apparatuses of such type are known as linear or matrix television cameras or cameras, and if they are able process the acquired image to analyze information of interest, they are also named as "smart cameras".

The result of the optical inspection performed by the inspection unit is communicated to an outer control apparatus, for example the control apparatus of the packaging machine that is suitable for treating the groups of cigarettes, by a communication network of Ethernet or of another type, at high data transmission speed. Alternative communication means can also be provided, which are made by a set of digital input and output signals from the optical apparatus, connected by analogue digital signals that are respectively input and output signals to the control apparatus of the packaging machine.

The control apparatus of the packaging machine is thus able to reject directly (or transmit a defect message to an outside device that performs the rejection operation) the defective group, which is deemed not to conform to the requested quality requirements, as soon as the group reaches a rejection station.

The expression "image acquisition optical apparatus for tridimensional profile" means an optical apparatus that in addition has operating parameters, such as for example a diaphragm aperture, a focal distance or a zoom, which are set in such a manner that the light trace on the end of the cigarette is clearly identifiable as a scanning line when the light trace is acquired in the respective image.

In order to inspect a head face of a group of cigarettes, from EP1674395, of the same applicant, performing a tridimensional scan of the head face of the group of cigarettes is also known, exploiting the teachings of EP0634112 to analyze, in detail, the ends of the three layers of cigarettes making up the group, when a forming pocket in which the group of cigarettes is housed is conveyed and advanced with continuous motion by the transporting conveyor through an inspection station.

The transferring and inspection unit shown by EP1674395 comprises a light blade that illuminates the head face of the group parallel to the axes of the cigarettes and three optical apparatuses, each of the type shown by EP0634112, to acquire in succession respective profile lines of the inspected cigarettes. The tridimensional scan of the face of the group is thus performed by layers and with a plurality of successive scans, which are used to reconstruct the head face of the group of cigarettes.

Unlike U.S. Pat. No. 4,511,045, which needs a succession of cyclical machine cycles to associate with each scanning instant the advancing position of the pocket along the advancing path, the inspection unit comprises forming pockets provided with respective permanent magnets, and a plurality of magnetic resistances arranged in succession along the advancing path for a greater portion of the dimension of the forming pocket, this dimension being measured parallel to the to the advancing direction of the transporting conveyor. The magnetic resistances are arranged at the inspection station such that the interaction between the permanent magnet mounted on the forming pocket with the plurality of magnetic resistances positioned in the inspection station generates a signal indicating the position where the forming pocket is during the inspection with no need to use the cyclical advancing signals of the transporting conveyor.

The presence of magnets along the advancing path has some drawbacks. Firstly the presence of the magnets makes the transferring and inspection unit complex and costly inasmuch as the magnets have to be positioned on each forming pocket.

Further, the precision in the reconstruction of the tridimensional profile of the head face of the group is delegated entirely to the precision with which the magnetic resistances interact with the permanent magnets i.e. to the precision of the reconstruction by interaction between magnets of the advancing position of the pocket. The presence is thus necessary of a very efficient processing device, which is simultaneously able to process the acquired images of the head face of the group for the optical inspection and is also able to analyze the signals of variation of the magnetic flow in the magnetic resistances for the purposes of the reconstruction of the advancing position of the conveyor.

With regard to the sensitivity of the optical inspection performed according to the teachings of EP0634112, this is provided by the analysis of the deviation of the light trace from an ideal rectilinear light trace that intercepts the tip of the elongated element (whether cigarette or filter), based on a threshold value established a priori. The end of the elongated element is in fact considered to be defective if the profile detected in the acquired image with respect to a theoretical straight line has a deviation that is greater than the threshold value. Accordingly, in order to evaluate correctly the threshold value, numerous laboratory tests are necessary, which are run during the step of calibrating the inspection unit to recreate the lighting conditions of the tridimensional scan and of the configuration of the optical assembly as installed in the machine, which are used during the operating step of the inspection. Nevertheless, variations due to the overall lighting of the area in which the transporting conveyor is installed may affect the result of the scan in a decisive manner. Tridimensional scans of an end of a cigarette could result therefrom that might not be conformant to the requested quality requirement for the cigarettes.

Usually, the inspection unit is configured for inspecting only the ends containing tobacco. With the spread of the particular filters disclosed above, the need is increasing of also inspecting the ends of cigarettes in which the filtering material is present. Nevertheless, the inspection unit shown by EP1674395 is not suitable for also being installed on the side of the filters because the optical assembly comprises the projector and three optical apparatuses, that having to be tilted with respect to the light blade emitted by the projector, occupy a significant overall dimension on the inspection station side.

SUMMARY

The object of the present invention is to provide a transferring and inspection unit of a group of elongated elements that is free of the drawbacks disclosed above or that is, at the same time, easy and cheap to make.

A further object of the present invention is to provide a transferring and inspection unit that enables a tridimensional profile to be reconstructed of a face of the group of elongated elements by a plurality of tridimensional scans, avoiding synchronization by a cyclical advancing signal of the conveyor and that at the same time avoids the need for additional position tracing elements with respect to the inspection station.

In accordance with the present invention, a transferring and inspection unit is provided, according to what is claimed in the enclosed claims.

BRIEF DESCRIPTION OF THE DRAWINGS

The present invention will now be disclosed with reference to the attached drawings that illustrate some embodiments thereof by way of non-limiting example, in which:

FIG. 4 shows another axonometric view of the transferring and inspection unit of FIG. 3, observed from the side of second front faces of the forming pockets;

FIG. 5 is a magnification of FIG. 4, with some parts removed for the sake of clarity, that shows the first optical assembly and the second optical assembly, at the first inspection position and the second inspection position;

FIG. 6 is a top view of the transferring and inspection unit of FIG. 5;

DETAILED DESCRIPTION

Figure 1:
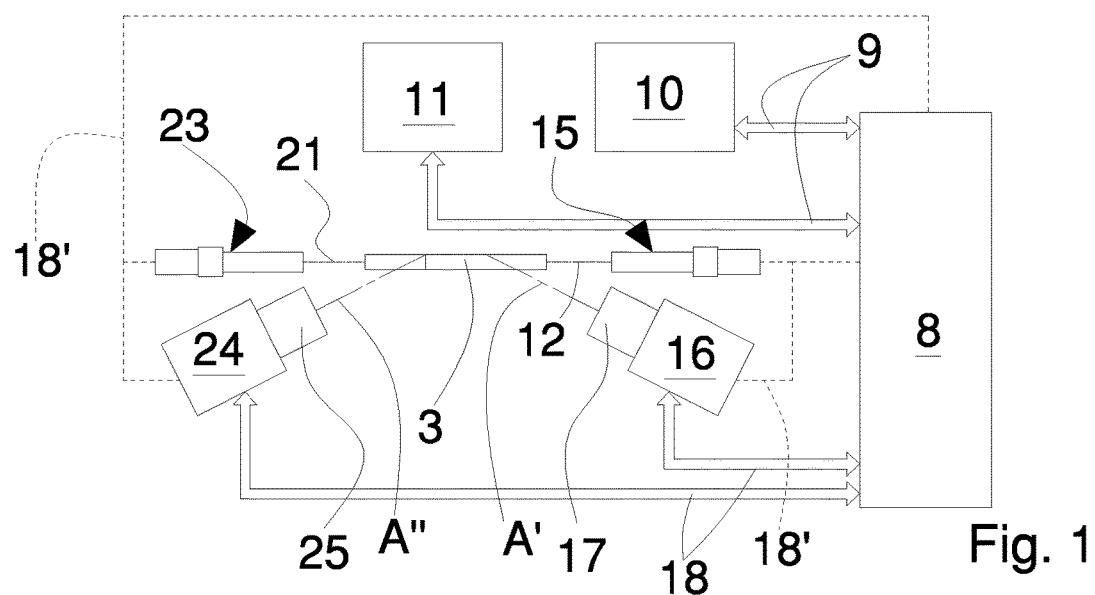
FIG. 1 shows a schematic view of a transferring and inspection unit according to the present invention comprising a first optical assembly for the tridimensional scan, a second optical assembly for the tridimensional scan, each comprising respectively an optical apparatus for a tridimensional profile and a respective projector of a respective light blade, and a processing device of the inspection unit.

In this description, identical elements that are common to the illustrated embodiments are indicated by the same numbering.

As illustrated in the attached figures, with the number 1 there is indicated overall a transferring and inspection unit of a group 2 of elongated elements 3 that are rod-shaped for smoking articles, in particular of cigarettes.

The transferring and inspection unit 1 is suitable for inspecting a first head face 2a of the group 2 i.e. first ends of cigarettes 3 constituting the group 2, and is intended to be integrated into a machine of the tobacco industry, i.e. into a packaging machine.

The transferring and inspection unit 1 comprises a transporting conveyor 4 on which are fixed, in particular equidistantly, a plurality of forming pockets 5, which is configured to advance each pocket 5 in an advancing direction D along a set advancing path P through a first inspection position 6 (FIG. 6).

Each forming pocket 5, which has an elongated substantially parallelepiped shape, has a longitudinal axis T and defines internally a hollow tubular housing 7, which is also substantially parallelepiped, which has a first mouth 7a on the side of a first front face 5a of the forming pocket. The hollow housing 7 is suitable for housing the group 2 of cigarettes 3 to be inspected.

The hollow housing 7 has further a second mouth 7b on the side of a second front face 5b. It should be noted (FIGS. 8, 10, 12, 14, 16) that one of the two mouths 7b is shaped so as to be slightly tapered inwards inasmuch as the group of cigarettes is pushed inside the hollow housing 7 advancing on the side of the ends containing tobacco from precisely the mouth 7b.

Figure 11:
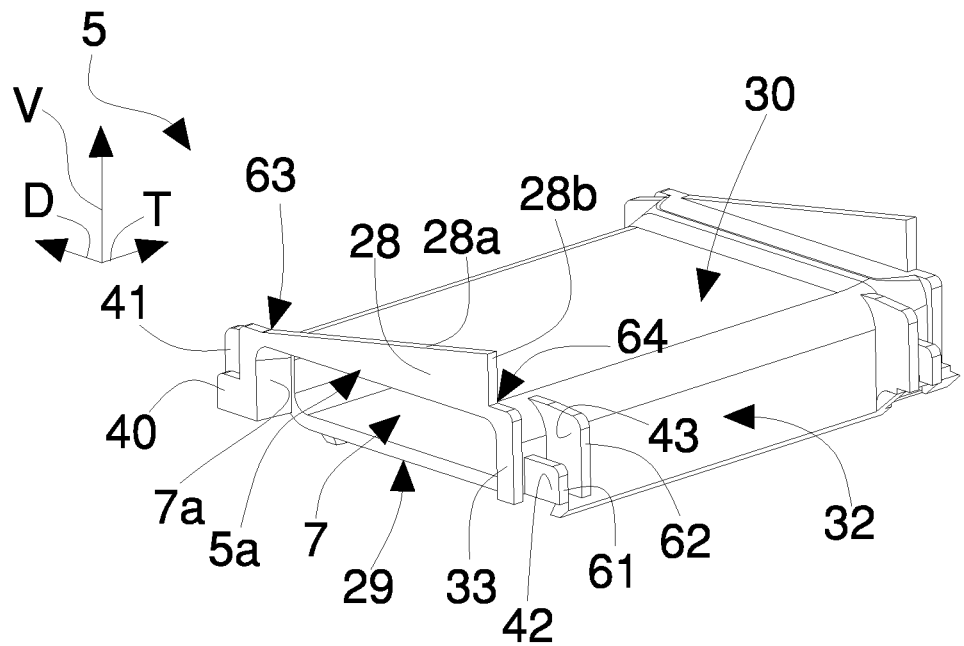
FIG. 11 is an axonometric view of the forming pocket of FIG. 10, observed from the side of the first front face.

The forming pocket 5 extends along three directions that are mutually orthogonal to one another, i.e. a first direction defined by the longitudinal axis T of the pocket 5, the remaining two directions being defined by the advancing direction D of the pocket 5 and by a vertical direction V, that is orthogonal to both the advancing direction D of the pocket 5 and the longitudinal axis T of the pocket 5 itself. In other words, the forming pocket 5 is advanced by the transporting conveyor 4 perpendicularly to the longitudinal axis T thereof (FIG. 11).

The group 2 of cigarettes 3 usually consists of twenty cigarettes 3, the axis S of each being arranged parallel to the longitudinal axis T of the forming pocket 5 and thus perpendicular to the advancing direction D of the conveyor 4.

The transferring and inspection unit 1 comprises a processing device 8 that can for example be connected by a first communication network 9, which has been disclosed previously and is not disclosed again here for the sake of brevity, to a control apparatus 10 of the packaging machine, typically a machine control unit, to exchange data and/or controls with the processing device 8.

The transferring and inspection unit 1 can for example receive an inspection start command from the machine control apparatus 10 and provide the control apparatus 10 with a result of the inspection. Alternatively, the transferring and inspection unit 1 can activate independently the inspection of the group 2 and provide the control apparatus 10 with the result of the inspection.

The result of the inspection can for example be displayed on a screen 11 intended to make an HMI operator interface.

The transferring and inspection unit 1 can further comprise an inspection start sensor (not illustrated), for example a photocell, which is suitable for communicating to the control apparatus 10 the presence of a new forming pocket 5 to be inspected in the first inspection position 6. The inspection start command can for example be emitted by the control apparatus 10 when the inspection start sensor detects a forming pocket.

Alternatively, the control apparatus 10 can use a synchronism signal that corresponds to an advancing position, which is known, of the transporting conveyor 4 and emit the inspection start command when a new forming pocket 5 to be inspected advances in the first inspection position 6.

The transferring and inspection unit 1 further comprises a first tridimensional inspecting optical assembly, configured to perform in respective successive scanning instants a plurality of first tridimensional optical scans by projecting a first light blade 12 on the first head face 2a of the group 2, during advancing of the forming pocket 5 through the first inspection position 6.

The processing device 8 is configured to obtain, for each first tridimensional scan, a respective first scanning line 13 (FIG. 9) of the first head face 2a of the group 2 of cigarettes, associated with the respective scanning instant.

The processing device 8 is further configured also to reconstruct a first tridimensional profile of the first head face 2a of the group 2 on the basis of the plurality of the first scanning lines 13, positioned in respective first reference positions.

Each first reference position is a distance in the advancing direction D of the respective first scanning line 13 from a first reference element, placed in a known position in the first front face 5a of the pocket 5, and indicates the position inside the first tridimensional profile in which the respective first scanning line 13 has to be positioned in order for the reconstructed tridimensional profile to be correct. Each first reference position provides in other words information on the zone of the first head face 2a of the group 2 inspected at the scanning instant.

It should be noted that the processing device 8 is configured to establish the scanning instants of the first head face 2a of the group 2, i.e. the moment in which to activate each first tridimensional scan, on the basis of an operating speed of the packaging machine that also sets an advancement speed for the transporting conveyor 4. The greater the operating speed of the packaging machine, the less the lapse of time within which a forming pocket 5 containing the group of cigarettes 2 passes through the first inspection position 6, i.e. in front of the first light blade 12, to be inspected and thus the more scanning instants that are close to one another have to be selected. On the other hand, at low operating speeds of the packaging machine, the scanning instants of the first head face 2a can be selected that are more distant in time because the time necessary for the passage of the group of cigarettes 2 in the inspection position 6 is greater.

The inspection frequency thus varies over time according to the operating speed of the packaging machine and the processing device 8 is thus usually configured to receive the operating speed of the packaging machine from the machine control apparatus 10.

For example, if the group 2 is made up of cigarettes that are 8 mm in diameter and it is required to reconstruct the first tridimensional profile of the end of each cigarette of the first head face 2a on the base of at least 40 first scanning lines, the frequency of the tridimensional scans of the first head face will vary from a maximum of 10,000 acquisitions/sec if the operating speed of the packaging machine is equal to 1000 packets/minute at a minimum of 2,500 acquisitions/second if the operating speed of the packaging machine is for example 250 packets/minute.

The first tridimensional inspecting optical assembly comprises a first projector 15 of the first light blade 12 and a first optical apparatus 16 for a 3D profile. The first projector 15 is configured to project the first light blade 12 on the first head face 2a of the group 2, and the first optical apparatus 16 is arranged to frame the first head face 2a of the group 2 to acquire in a first image (not illustrated) the first head face 2a of the group 2 itself.

The first optical apparatus 16 has a first optical axis A' and is provided with a respective objective 17 configured to frame the first inspection position 6 i.e. the forming pocket 5 containing the group 2 of cigarettes 3, when the forming pocket 5 is inside the field of view of the first optical apparatus 16 itself.

It is pointed out that field of view means an acquisition field of the first optical apparatus 16, or a pre-set area inside which the images of the forming pocket can be acquired, which is inside a focusing range and for which, along the first optical axis A' of the objective 17 it is possible to define a set depth of field.

Clearly, the entire forming pocket 5 has to be framed by the first optical apparatus 16, i.e. must be inside the field of view thereof, at the moment in which the control apparatus 10 emits the inspection start command.

The first projector 15 is arranged to project the first light blade 12 parallel to the longitudinal axis T of the pocket 5 and perpendicularly to the advancing direction D of the pocket and to the head face 2a of the group 2.

The first optical apparatus 16 for a 3D profile has to be arranged appropriately with respect to the first light blade 12 and with respect to the group 2 of elongated elements 3, so that the inspection can take place. As illustrated schematically in FIGS. 1 and 2, in which the first light blade 12 is arranged at and is coplanar with a longitudinal axis S of the cigarette, the first optical apparatus 16 has to be positioned so that the first optical axis A' does not lie on the plane of the respective first light blade 12 but instead forms a first angle $\alpha'$ comprised between 10° and 80°, preferably between 30° and 60°, with respect to the plane on which the first light blade 12 lies.

In this manner, by performing a tridimensional optical scan by the first light blade 12, i.e. by projecting the first light blade 12 onto the first group head face 2a a respective first light trace (not illustrated) is obtained.

As said before, the first optical apparatus 16 is for a 3D profile because it has operating parameters that are so set that each first light trace is clearly identifiable when it is acquired in the respective first image, in order to be able to obtain the corresponding first scanning line 13, which corresponds to the first light trace. For example, each first scanning line 13 can appear as a light clear line on an image the background of which is dark.

The first optical apparatus 16 comprises a respective control device (not illustrated) to command acquiring of the first image and in addition switching on of the respective first projector 15 associated therewith. The control device of the optical apparatus 16 can also be made and configured so as to process the first image to identify a profile of the group 2 of cigarettes.

Alternatively and/or in addition, the processing device 8 of the transferring and inspection unit 1 can be configured to command in the first optical apparatus 16 acquiring of the images, or switching on of the first projector 15 of the light blade 12 and also processing of the acquired image by the optical apparatus 16, in order to identify the profile of the group 2 of cigarettes. In the latter case, if the processing device 8 is configured to image processing, the control device of the optical apparatus 16 can be simpler, with only functions of acquiring the image and controlling the respective projector 15 of the light blade 12.

It should be noted that, as illustrated schematically in FIG. 1, the first optical apparatus 16 and the processing device 8 are connected together by a second communication network 18, for example of Ethernet type via cable or WI-FI, which can be the same as or different from the first communication network 9. The first projector 15 is on the other hand connected preferably directly to the first optical apparatus 16 by respective digital inlet/outlet signals 18' which can be optionally provided, as illustrated by the dashed line, also between the processing device 8 and the first projector 15.

Figure 2:
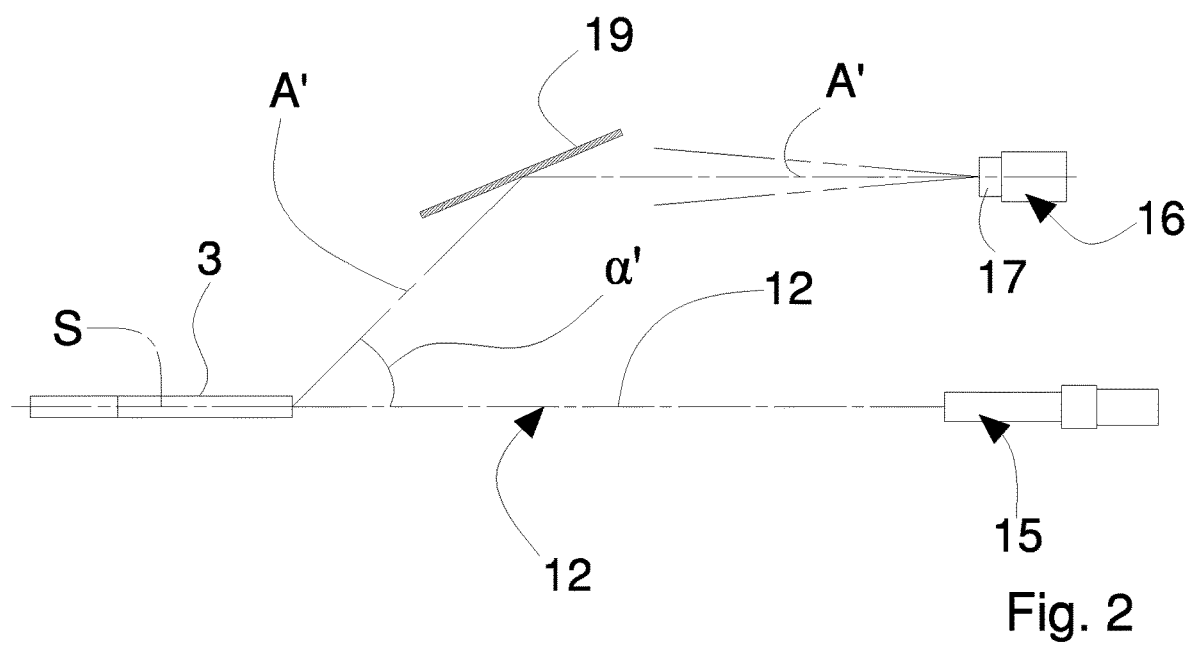
FIG. 2 shows a schematic view of an elongated element inspected by an optical assembly of the transferring and inspection unit according to the invention, in which the optical apparatus for a tridimensional profile is suitable for acquiring an image of an end of the elongated element through a deflector suitable for generating un virtual mirror plane of the elongated element.
Figure 3:
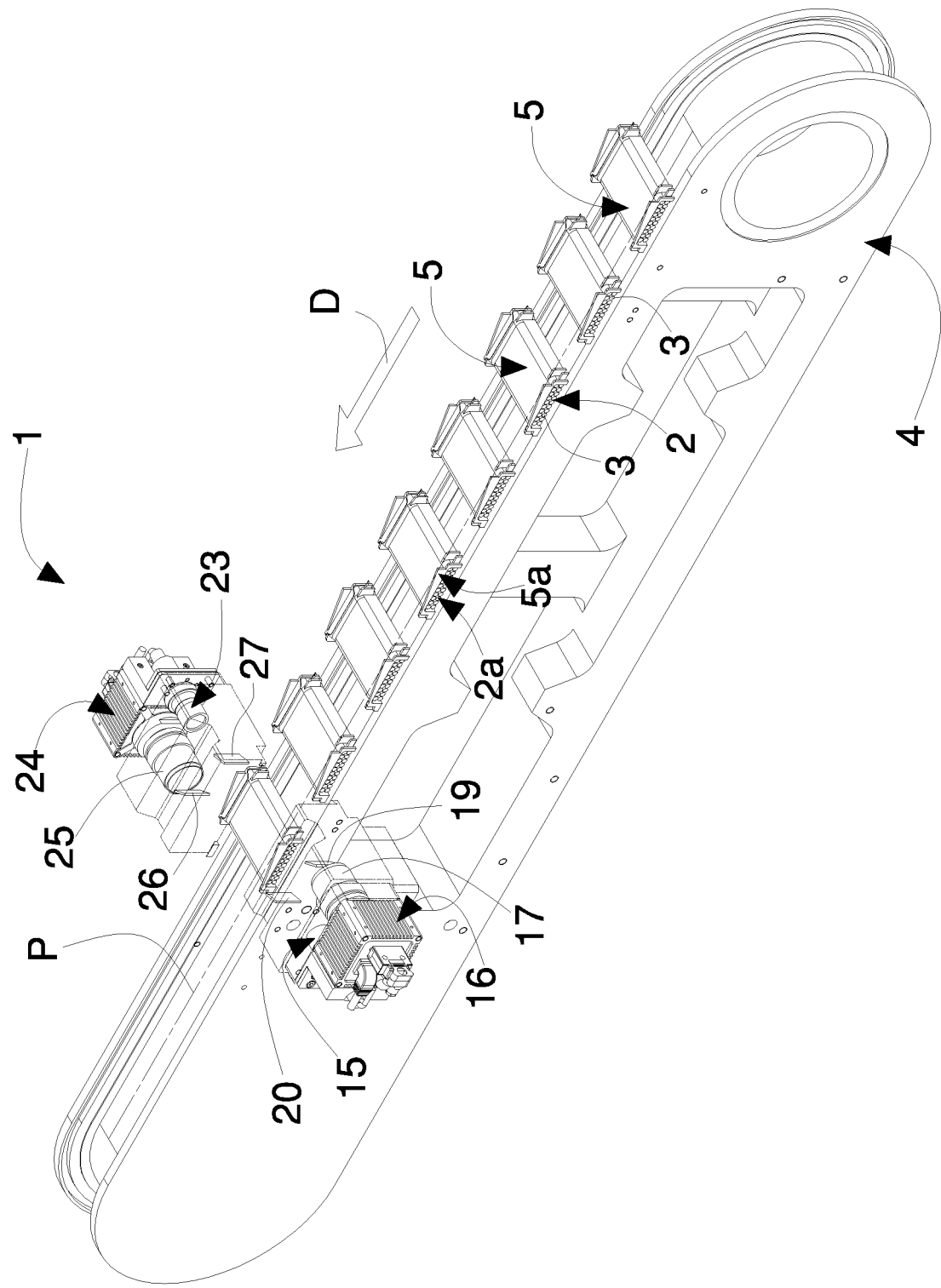
FIG. 3 shows a schematic axonometric view of the transferring and inspection unit according to the invention, in which a transporting conveyor is present of a plurality of forming pockets that house respective groups of cigarettes, in which the pockets are conveyed through a first inspection position and a second inspection position, the unit being observed from the side of first front faces of the pockets in which the head faces of the groups have tobacco.
Figure 7:
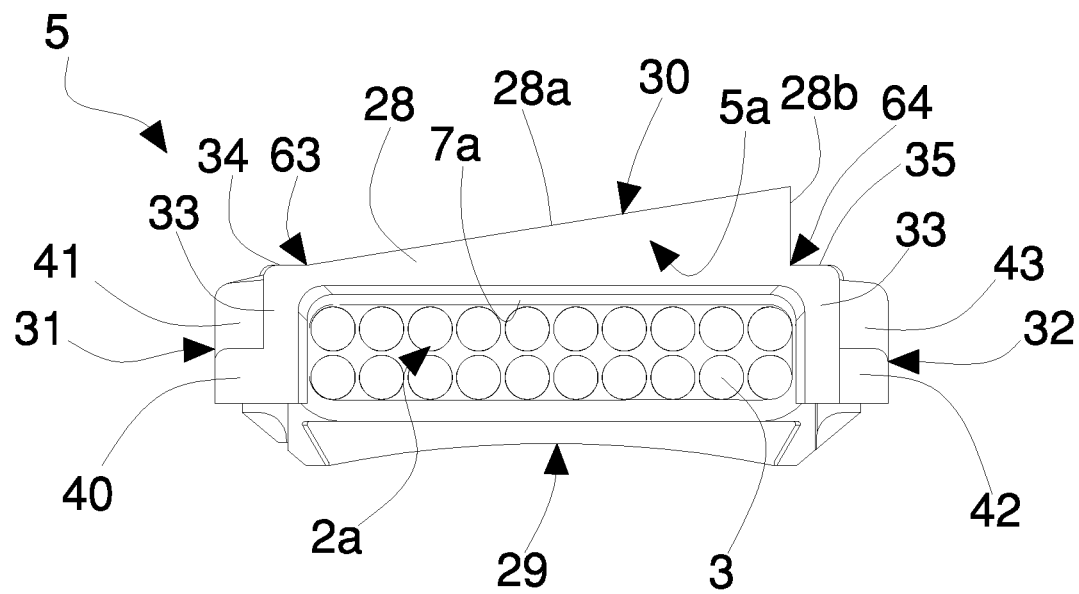
FIG. 7 is a front view of a forming pocket containing a group of cigarettes, observed from the side of a first head face of the group in which ends containing tobacco are present.

As illustrated in FIG. 2, the first optical assembly further comprises a respective first optical deflector 19, for example a first mirror, suitable for generating a first virtual mirror plane of the first image such that the first optical apparatus 16 can acquire the first image from the first optical deflector 19 however the first optical apparatus 16 is arranged with respect to the forming pocket 5. The first optical deflector 19 enables the first optical apparatus 16 to be positioned parallel to the first projector 15, the tilt between the first optical axis A' (it should be noted that the first optical deflector 19 generates a "virtual" optical axis as illustrated in FIG. 2) of the first optical apparatus 16 and the light blade 12 being guaranteed by the arrangement of the first optical deflector 19.

As illustrated in FIGS. 3 to 6, the first optical assembly can comprise optionally also a second optical deflector 20, for example a second mirror, suitable for generating a second virtual mirror plane of the first image, when the first image is reflected by the first optical deflector 19. This enables, if necessary, possible problems of overall dimensions and positioning of the projector 15 and of the optical apparatus 16 in the transferring and inspection unit 1 to be overcome.

In order to inspect simultaneously both ends of the cigarettes comprised in the group 2, i.e. both the ends containing tobacco and the ends containing filtering material, as shown schematically in FIG. 1, the transferring and inspection unit 1 comprises a second optical tridimensional inspection assembly configured to perform in respective successive instants a plurality of second tridimensional optical scans projecting a second light blade 21 on a second head face 2b of the group 2, opposite the first head face 2a, during advancing of the forming pocket 5 through a second inspection position 22.

The processing device 8 is in addition configured to obtain for each second tridimensional scan, a respective second scanning line (not illustrated) associated with the respective scanning instant and to reconstruct a second tridimensional profile of the second head face 2b of the group 2 on the basis of the plurality of second scanning lines, positioned in respective second reference positions.

Each second reference position is a distance in the advancing direction D of the respective second scanning line from a second reference element, placed in a known position in the second front face 5b of the pocket 5, and indicates the position inside the second tridimensional profile in which the respective second scanning line has to be positioned in order for the reconstructed tridimensional profile of the second head face 2b to be correct.

The second reference position indicates the position of the forming pocket 5 in relation to the second inspection position 22, similarly to what has been said previously about the first inspection position 6.

It is observed that the first inspection position 6 and the second inspection position 22 can also not be aligned along the advancing path P of the transporting conveyor 4, as will be seen in detail below.

In addition, the scanning instants for the first head face 2a of the group 2 may be different from the scanning instants for the second head face 2b, owing to the different quality required for inspecting the tobacco side of a cigarette 3 with respect to the inspection on the filtering material side.

If it is, in fact, necessary to reconstruct with the greatest number of first scanning lines possible an end of a cigarette 3 containing tobacco to define possible lacks thereof (a group in which there is even only one cigarette with an empty tip is to be rejected), many fewer second scanning lines could be necessary to judge the quality of an end containing filtering material. Thus the frequency of the first tridimensional scans could be different from the frequency of the second tridimensional scans.

The second optical tridimensional inspection assembly comprises a second projector 23 of the second light blade 21 and a second optical apparatus 24 for a 3D profile. The second projector 23 is configured to project the second light blade 21 at least on the second head face 2b of the group 2, and the second optical apparatus 24 is arranged to frame the second head face 2b of the group 2 to acquire in a second image (not illustrated) the second head face 2b of the group 2 itself.

The second optical apparatus 24 has a second optical axis A" and 6 provided with a respective second objective 25 configured to frame the second inspection position, i.e. the forming pocket 5 containing the group 2 of cigarettes 3, when the forming pocket 5 is inside the field of view of the second optical apparatus 24 itself.

Also the second projector 23 is arranged to project the second light blade 21 parallel to the longitudinal axis T of the pocket 5 and perpendicularly to the advancing direction D of the pocket and to the second head face 2b of the group 2. In detail, the first light blade 12 and the second light blade 21 are parallel to one another, in particular are coplanar with one another.

The same considerations apply to the second optical assembly that were made previously for the first optical assembly, which for the sake of brevity are not detailed here.

Between the second optical axis A" of the second optical apparatus 24 and the second light blade 21 a second angle (not shown) is formed, that enables a second light trace (not illustrated) to be obtained, projecting the second light blade 21 onto the second head face 2b of the group 2.

Also the second optical apparatus 24 is configured specifically for a 3D profile and in this manner each second light trace is identifiable clearly in the respective second image, to obtain therein the second scanning line that corresponds to the second light trace.

The second optical apparatus 24, can also comprise a respective control device (not illustrated) to command acquiring of the second image and in addition switching on of the respective second projector 23 but alternatively and/or in addition, the processing device 8 of the transferring and inspection unit 1 can be configured to command in the second optical apparatus 24 acquiring of the images, or switching on of the second projector 23 of the light blade 21 and also processing of the image acquired from the second optical apparatus 24.

Also the second optical apparatus 24 can be connected to the processing device 8 by the second communication network 18, whereas also the second projector 23 is on the other hand preferably connected directly to the second optical apparatus 23 by the digital inlet/outlet signals 18' that can be provided optionally, as illustrated by the dashed line, also between the processing device 8 and the second projector 23.

As illustrated in FIGS. 3 to 6, the second optical assembly comprises a respective further first optical deflector 26 and optionally a further second optical deflector 27 (a further first mirror and a further second mirror), respectively suitable for generating a first virtual mirror plane of the second image and optionally also a second virtual mirror plane of the second image, when the second image is reflected by the further first optical deflector 26 and optionally by the further second optical deflector 27.

Similarly to what has been said for the first and the second optical deflector 19, 20 of the first optical assembly, the further first optical deflector and the further second optical deflector 26, 27 of the second optical assembly enable, if necessary, possible problems of overall dimensions or positioning of the second projector 23 and of the second optical apparatus 24 of the second optical assembly in the transferring and inspection unit 1 to be solved.

It is observed that the first inspection position 6 is aligned on the second inspection position 22 along the advancing path P of the transporting conveyor 4, inasmuch as the first light blade 12 and the second light blade 21 are substantially coplanar (FIG. 6). The first inspection position 6 is given by the position in which the advancing path P of the forming pocket 5 is hit by the first light blade 12.

According to a version that is not illustrated, although the first light blade 12 remains parallel to the second light blade 21, the first inspection position 6 can be moved with respect to the second inspection position 22 along the advancing path P, if there are problems in positioning the first optical assembly and/or the second optical assembly along the path P.

In use, in order to inspect simultaneously both ends of the cigarettes 3 comprised in a group 2 when the latter is housed in a respective forming pocket 5 and is advanced by a transporting conveyor 4 through a respective first inspection position 6 and second inspection position 22, in respective successive scanning instants a plurality of first tridimensional optical scans is performed by projecting a first light blade 12 over a first head face 2a of the group 2 such that, for each first tridimensional scan, a respective first scanning line is obtained, associated with the respective scanning instant. On the basis of the plurality of the first scanning lines, positioned in respective first reference positions, a first tridimensional profile of the first head face 2a is reconstructed, for example the head face 2a of the group 2 in which the ends contain tobacco.

A plurality of second tridimensional optical scans is also performed, in respective successive scanning instants, by projecting a second light blade 21 onto a second head face 2b of the group 2, opposite the first head face 2a, such that, for each second tridimensional scan, a respective second scanning line is obtained, associated with the respective scanning instant. On the basis of the plurality of second scanning lines, positioned in respective second reference positions, a second tridimensional profile of the second head face 2b is reconstructed, for example the head face 2b of the group 2 in which the ends contain filtering material.

By processing the first tridimensional profile and the second tridimensional profile, it is possible advantageously to inspect simultaneously both the first head face 2a of the group 2 and the second head face 2b and thus have quality indications for the group 2 of cigarettes 3.

By thus using two optical assemblies for the tridimensional scan, one for the first head face 2a and the second for the second head face 2b, using respectively a first light blade 12 and a second light blade 21 in association with a first optical apparatus 16 and with a second optical apparatus 24 that frame respectively the first head face 2a and the second head face 2b of the group 2 opposite one another the quality of the group of elongated elements 3 can be evaluated cheaply and simply.

It is added that, owing to the presence of a first optical deflector 19, in the first optical assembly and of a further first optical deflector 26 in the second optical assembly, and optionally owing to the presence of a second optical deflector 20, in the first optical assembly and of a further second optical deflector 27 in the second optical assembly, it is possible to inspect both the head faces 2a, 2b of the group 2 effectively and cheaply, obtaining a very compact transferring and inspection unit 1.

It has been said that the processing device 8 is configured to reconstruct the first tridimensional profile of the first head face 2a of the group 2 on the basis of the plurality of the first scanning lines 13, positioned in the respective first reference positions, which take account of the position of the forming pocket 5 in relation to the inspection position 6 in each scanning instant.

The first tridimensional optical assembly is further configured also to perform at least one tridimensional scan of the first front face 5a of the pocket 5, with the dual purpose of calculating each reference position for each first scanning line (avoiding cyclical advancing signals arising from the transporting conveyor 4) and reconstructing the first tridimensional profile of the head face 2a of the group 2 with extreme precision.

Wanting to avoid calculating each first reference position on the basis of the cyclical advancing signals of the transporting conveyor 4, it is advantageous to so set up the first front face 5a of the forming pocket 5 that it comprises a first shaped surface 28.

According to the present invention and as shown in FIGS. 3 to 14, the first tridimensional optical assembly is configured to perform simultaneously with each first tridimensional scan of the first head face 2a of the group 2 also a first tridimensional scan of the first shaped surface 28 to obtain for each first scanning line 13 also a respective further scanning line 14.

The processing device 8 is in addition configured to calculate the corresponding first reference position of each first scanning line 13 analyzing the respective further scanning line 14.

Advantageously, as will be seen better below, the first shaped surface 28 is flat and thus the further scanning line 14 is a segment.

The first projector 15 is configured to project the first light blade 12 both on the first head face 2a of the group 2 and in addition onto the first shaped surface 28 of the pocket 5, and the first optical apparatus 16 is arranged to frame both the first head face of the group 2a and in addition the first shaped surface 28 of the pocket 5 and to acquire in the same first image (not illustrated) both the first head face 2a of the group 2 and the first shaped surface 28 of the pocket 5. In this manner, the first tridimensional optical assembly can perform simultaneously the tridimensional scan of the first head face 2a of the group 2 and of the first front face 5a of the pocket 5.

What has been said before with regard to positioning the projector 15 with respect to the forming pocket 5, to the configuration of the optical apparatus 16 and to the reciprocal positioning of the projector 15 and optical apparatus 16 remains valid. The fact also remains valid that, in order to project correctly the first light blade 12 onto the first head face 2a of the group 2 and onto the front face 5a of the pocket 5, the first light blade has to lie on a plane parallel to the longitudinal axis T of the pocket, in turn parallel to the longitudinal axis of the cigarettes 3 and perpendicular to the advancing direction D of the pocket 5 itself.

In this manner, by performing a tridimensional optical scan by the first light blade 12, a respective further light trace is obtained on the shaped surface in addition to the respective first light trace.

Each first reference position, i.e. the position of the pocket with respect to the first inspection position 6 is obtainable without using the cyclical advancing signals of the transporting conveyor 4 along the set path P.

Figure 9:
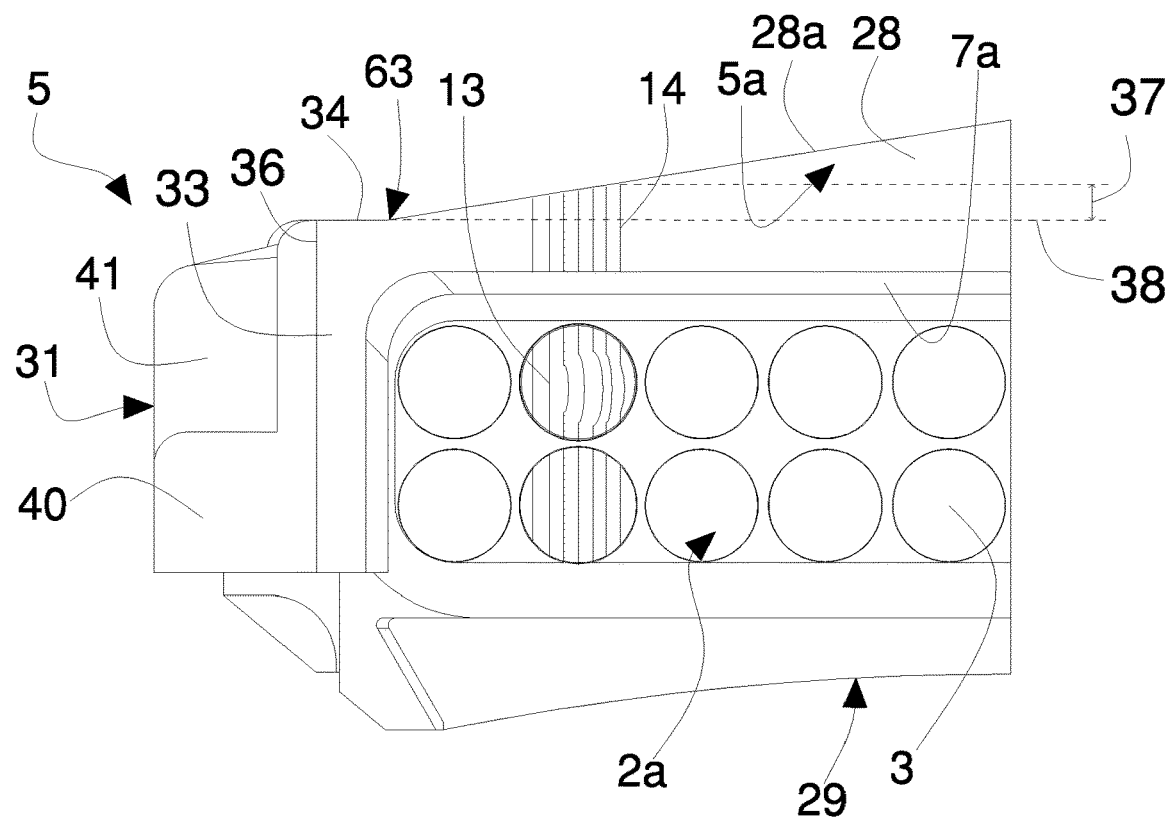
FIG. 9 is a magnification of the forming pocket of FIG. 7, with some parts removed for the sake of clarity, in which are shown a plurality of successive first group profiles and a plurality of corresponding first pocket profiles, as acquired in succession from the first optical apparatus of the first optical assembly.

In FIG. 9 the different first scanning lines 13 and the respective further scanning lines 14 are shown schematically as projected in succession and acquired on the first shaped surface 28.

The forming pocket 5 comprises a first greater lateral face 29, connected to the transporting conveyor 4 and a second greater lateral face 30, opposite the first greater lateral face 29; a first lesser lateral face 31, arranged downstream of a second lesser lateral face 32 with respect to the advancing direction D and opposite the first lesser lateral face 31.

The first front face 5a comprises a first outline surface 33 that surrounds the first mouth 7a, which is flat and is perpendicular to the longitudinal axis T of the pocket 5.

As shown in greater detail in FIGS. 7 to 14, the first shaped surface 28 is coplanar with the first outline surface 33, projects from an opposite side of the first greater lateral face 29 and is arranged at the group 2 of elongated elements 3.

The first outline surface 33 comprises a pair of rectilinear lateral edges, specifically a first lateral edge 34 and a second lateral edge 35. In particular the edges 34 and 35 are parallel to the advancing direction D and arranged outside the group 2 of elongated elements 3 on opposite sides of the first shaped surface 28.

The first optical assembly is in addition configured to perform in succession at least one tridimensional scan of the first lateral edge 34 and obtain a first edge scanning line 36, that is rectilinear, and lastly perform at least one tridimensional scan of the second lateral edge 35 to obtain a second rectilinear edge scanning line (not illustrated), respectively before and after performing the plurality of tridimensional scans of the first head face 2a of the group 2 and of the first shaped surface 28 that enable the first scanning lines 13 that are rectilinear and the respective further scanning lines 14 that are rectilinear to be obtained.

As the first shaped surface 28 and the first outline surface 33 are flat, advantageously the first edge scanning line 36, the second edge scanning line and each further scanning line 14 are rectilinear, in particular derive from respective light traces that are segments.

The first shaped surface 28 (FIGS. 7-12) has the shape of a right-angled triangle connecting the lateral edges 34 and 35. The triangle is provided with a tilted edge 28a constituting the hypotenuse whereas a cathetus 28b projects from the second lateral edge 35.

A first corner 63 is defined between the first lateral edge 34 and the hypotenuse 28a whereas a second corner 64 is defined between the cathetus 28b and the second lateral edge 35. The first reference element, with respect to which each reference position is defined, can be for example the first corner 63 or the second corner 64. Both the first corner 63 and the second corner 64 are parallel to the longitudinal axis T of the forming pocket 5 and thus perpendicular to the direction D.

The processing device 8 is suitable for calculating, for each tridimensional scan, a first reference distance 37 between one end of each further scanning line 14 and a reference line 38, in particular horizontal, joining respective ends of the first edge scanning line 36 and of the second edge scanning line.

If in fact the FIG. 9 is considered in which the different first scanning lines 13 are shown schematically, the respective further scanning lines 14 and the first edge scanning lines 36, as projected and acquired in succession on the first shaped surface 28 and on the outline surface 33, it can be noted that, considering each first reference distance 37, i.e. each segment defined between the end of each further scanning line 14 and the reference line 38, the respective first reference position of the first scanning line 13 (i.e. the distance of the first scanning line 13 for example from the first reference element 63) is directly proportional to the first reference distance 37.

Figure 13:
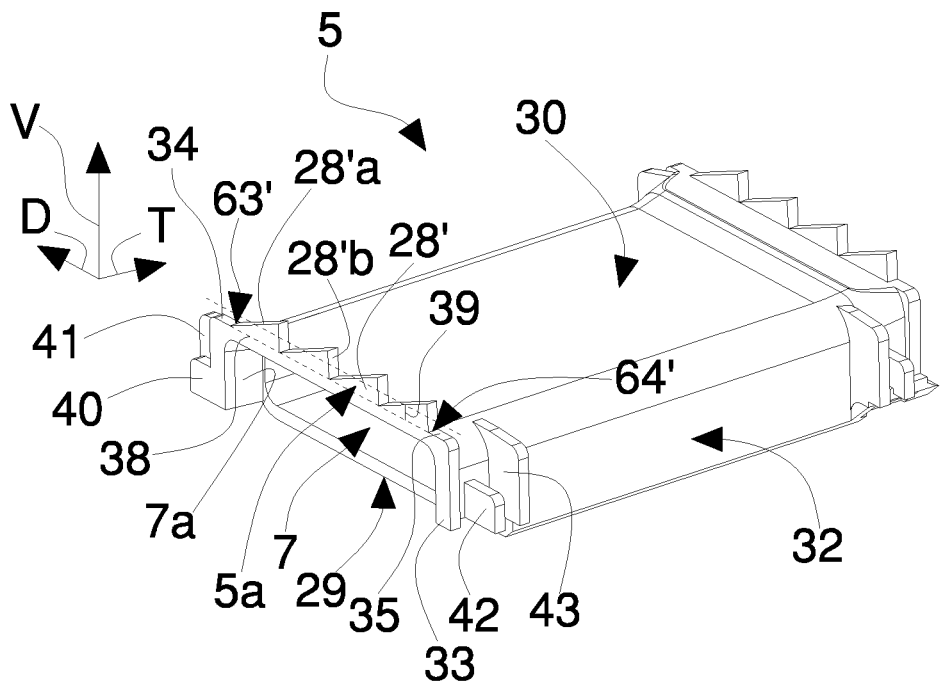
FIG. 13 is an axonometric view of a version of the forming pocket of FIG. 10, on the side of the first front face.
Figure 14:
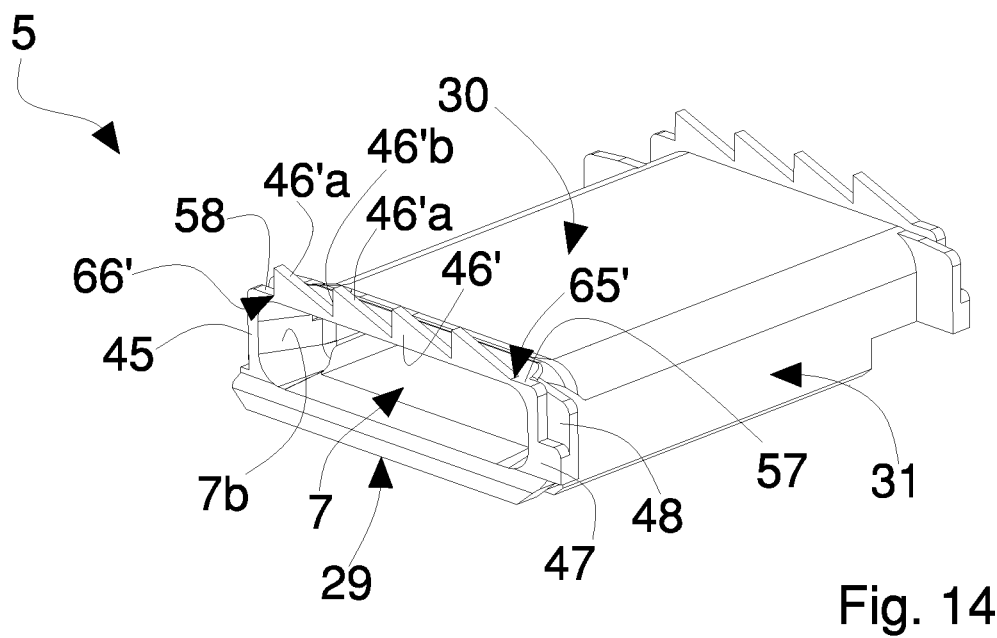
FIG. 14 is another axonometric view of the forming pocket of FIG. 13, on the side of the second front face.

According to the version shown in FIGS. 13 and 14, the first front face 5a comprises a first shaped surface 28' that is configured as a saw tooth provided with a plurality of tilted edges 28'a constituting respective hypotenuses of right-angled triangles extending between the lateral edges 34 and 35, each provided with the hypotenuse 28'a and with a cathetus 28'b. There is thus not a single right-angled triangle but a plurality of right-angled triangles and with each right-angled triangle in succession an ordinal number is associated that indicates the sequence with which each triangle is inspected, i.e. advances through the first inspection position 6.

According to this version, a first corner 63' is defined between the first lateral edge 34 and the first hypotenuse 28'a of a first right-angled triangle and a second corner 64' is defined between the cathetus 28'b of the last right-angled triangle and the second lateral edge 35. Again, what has been said before applies, i.e. the first reference element, with respect to which each reference position is given, can be for example the first corner 63' or the second corner 64'. Both the first corner 63' and the second corner 64' are parallel to the longitudinal axis T of the forming pocket 5 and thus perpendicular to the advancing direction D.

The processing device 8 is suitable for calculating a second reference distance 39 (FIG. 13) between one end of the further scanning line 14 and the reference line 38 joining respective edges of the first edge scanning line (not illustrated) and of the second edge scanning line (not illustrated). According to this version, the first reference position (i.e. the distance of the first scanning line 13 for example from the first reference element 63) is directly proportional to the second reference distance 39 and to the ordinal number associated with the triangle during the inspection step.

In use, by performing simultaneously with each first tridimensional scan of the first head face 2a of the group 2 also a first tridimensional scan of the first shaped surface 28 of the first front face 5a of the pocket 5 to obtain a respective further scanning line 14, it is possible to calculate the reference position of each first scanning line 13 analyzing the respective further scanning line 14.

By setting up the first shaped surface 28 as a flat surface, it is possible to calculate, for each scanning instant, the respective reference position by calculating a dimension of the further scanning line 14.

In detail, by setting up a shaped surface 28 of triangular shape or saw tooth 28' shape provided with a plurality of triangles, and arranging the shaped surface 28 between a pair of the rectilinear edges 34 and 35, and performing in succession at least one tridimensional scan of the first rectilinear edge 34, the plurality of tridimensional scans of the first head face 2a of the group 2 simultaneously with the plurality of respective tridimensional scans of the first front face 5a of the pocket 5 and lastly at least the tridimensional scan of the second rectilinear edge 35, the respective first reference position (from the first reference element 63, 63' or 64, 64') of each first scanning line 13 is proportional to a first reference distance 37 between ends of the respective further scanning line 14 and a reference line 38 between the rectilinear edges 34 and 35 or, in the case of the first shaped surface 28 made as a saw tooth, is proportional to a second reference distance 39, between an end of the respective further scanning line 14 and the reference line 38 between the rectilinear edges 34 and 35, and the ordinal number that identifies the inspected saw tooth.

Owing to the first front face 5a of the pocket 5 set up as a shaped surface 28 or 28' that is flat arranged at the group of cigarettes 2 it is possible to inspect easily both the group of cigarettes 2 and the forming pocket 5 and it is possible to obtain simply reference information, indicating the position of the group of cigarettes with respect to the first inspection position 6, from the further scanning line 14 obtained by projecting the first light blade 12 onto the first front face 5a of the pocket 5, in particular onto the first shaped surface 28 or 28' of the first front face 5a.

The forming pocket 5, which is suitably shaped, enables the group 2 to be transferred through the first inspection position 6 as far as the packaging machine but also enables the tridimensional profile of the head face 2a of the group 2 to be reconstructed correctly, without need for further synchronizing signals or additional elements along the advancing path.

If it is in addition, or alternatively, wished to reconstruct with precision a tridimensional profile of each end of the cigarettes belonging to the group 2, the first front face 5a of the pocket 5 comprises a first calibration surface 40 that is flat, arranged at a respective first pre-set calibration distance with respect to the first outline surface 33 and that lies on a plane perpendicular to the longitudinal axis T of the pocket 5. The first calibration surface 40 can be coplanar to the outline surface 33 as in the example of FIG. 10. The first front face 5a further comprises a second calibration surface 41 that is flat, arranged at a respective second calibration distance 53 that is pre-set with respect to the first outline surface 33, parallel to the first calibration surface 40 and staggered in relation thereto along the longitudinal axis T.

The first optical assembly is in addition configured to perform at least one respective first tridimensional scan of the first calibration surface 40 and at least one second tridimensional scan of the second calibration surface 41 to obtain respectively at least one first rectilinear calibration line (not illustrated) and a second rectilinear calibration line (not illustrated) respectively associated with the first calibration distance and with the second calibration distance 53. As the first calibration surface 40 and the second calibration surface 41 are flat, advantageously the first calibration line and the second calibration line are rectilinear, in particular derive from respective light traces that are segments.

If it is only necessary to reconstruct with precision a tridimensional profile of each end of the cigarettes belonging to the first head face 2a of the group 2, it is not necessary for the first outline surface 33 to be flat. In this case (not illustrated) the distances from the first outline surface 33 will be given for example, with respect to a plane tangential to the outline surface 33 in a point of interest.

The first calibration line and/or the second calibration line, placed at the respective pre-set calibration distances, are usable as references for evaluating possible deformations of each first scanning line 13 along the longitudinal axis T of the pocket 5.

According to an embodiment of the forming pocket 5, shown in FIGS. 3 to 14, the first calibration surface 40 and the second calibration surface 41 are arranged laterally on the same side towards one of the lesser lateral faces 31, 32 of the forming pocket 5, outwardly with respect to the respective lateral edge 34, 35. Further, the calibration surfaces 40 and 41 are staggered in relation to one another in the vertical direction V.

The optical assembly is in this manner configured to obtain with the same tridimensional scan, simultaneously, both the first calibration line and the second calibration line, before or after, the tridimensional scan of the respective lateral edge 34, 35 which respect to which they are external.

In other words, if precision is required in the evaluation of the tridimensional profile of the first head face 2a of the group 2 and the forming pocket 5 is configured as in FIGS. 3 to 14, the first and the second tridimensional scan of the calibration surfaces 40, 41 are performed simultaneously.

The first projector 15 is configured to project the first light blade 12 both onto the first calibration surface 40 and onto the second calibration surface 41, and the first optical apparatus 16 is arranged to frame both the first calibration surface 40 and the second calibration surface 41 to acquire in the same image (not illustrated) both the calibration surfaces 40, 41.

For example, if the first calibration surface 40 and the second calibration surface 41 of the first front face 5a are arranged outwardly with respect to the first lateral edge 34 to the first lesser lateral face 31, and are staggered in relation to one another in the vertical direction V, the optical assembly can perform with the same single tridimensional scan, before the tridimensional scan of the head face 2a of the group 2 of cigarettes 3, the tridimensional scan of the calibration surfaces 40 and 41.

Nevertheless, according to a version that is not illustrated, if it is only necessary to reconstruct with precision a tridimensional profile of each end of the cigarettes belonging to the first head face 2a of the group 2, the first calibration surface 40 and the second calibration surface 41 can be arranged outside the outline surface 33, or can replace the outline surface 33 itself, the presence of the first lateral edge 34 and of the second lateral edge 35 not being necessary.

Desiring further calibration lines, placed at respective further pre-set calibration distances, to increase further the detecting precision of each first scanning line 13, the first front face 5a comprises a third calibration surface 42 that is flat, arranged at a third calibration distance 54 that is pre-set with respect to the first outline surface 33 and that lies on a plane perpendicular to the longitudinal axis T of the pocket; and further comprises a fourth calibration surface 43 that is flat, arranged at a fourth calibration distance 55 that is pre-set with respect to the first outline surface 33, parallel to the third calibration surface 42 and staggered in relation thereto along the longitudinal axis T.

Similarly to what has been said about the first calibration surface 40 and for the second calibration surface 41, if the forming pocket 5 is configured as in FIGS. 3 to 14, the third calibration surface 42 and the fourth calibration surface 43 are arranged towards the other of the lesser lateral faces 32, or 31 of the forming pocket 5, outwardly with respect to the lateral edge 35, or 34 (or externally with respect to the outline surface 33) facing the other lesser lateral face 32, or 31. Further, the calibration surfaces 42 and 43 are staggered in relation to one another in the vertical direction V.

The optical assembly is in addition configured to obtain with the same further tridimensional scan, simultaneously, respectively both the third calibration line and the fourth calibration line, respectively associated with the third pre-set calibration distance 54 and with the fourth pre-set calibration distance 55, before or after, the tridimensional scan of the respective lateral edge 35, or 34. Also the third calibration line and the fourth calibration line are usable as further references to evaluate, with greater precision, possible deformations of each first scanning line 13 along the longitudinal axis T of the pocket 5.

For example, the third calibration surface 42 and the fourth calibration surface 43 are arranged towards the second lesser lateral face 32 outwardly with respect to the second lateral edge 35 and are staggered in the direction V such that the first projector 15 can project the first light blade 12 onto both the third calibration surface 42 and onto the fourth calibration surface 43, and the first optical apparatus 16 can simultaneously frame both the third calibration surface 42 and the fourth calibration surface 43 to acquire in the same image (not illustrated) both the third and the fourth calibration surface 42, 43.

Figure 10:
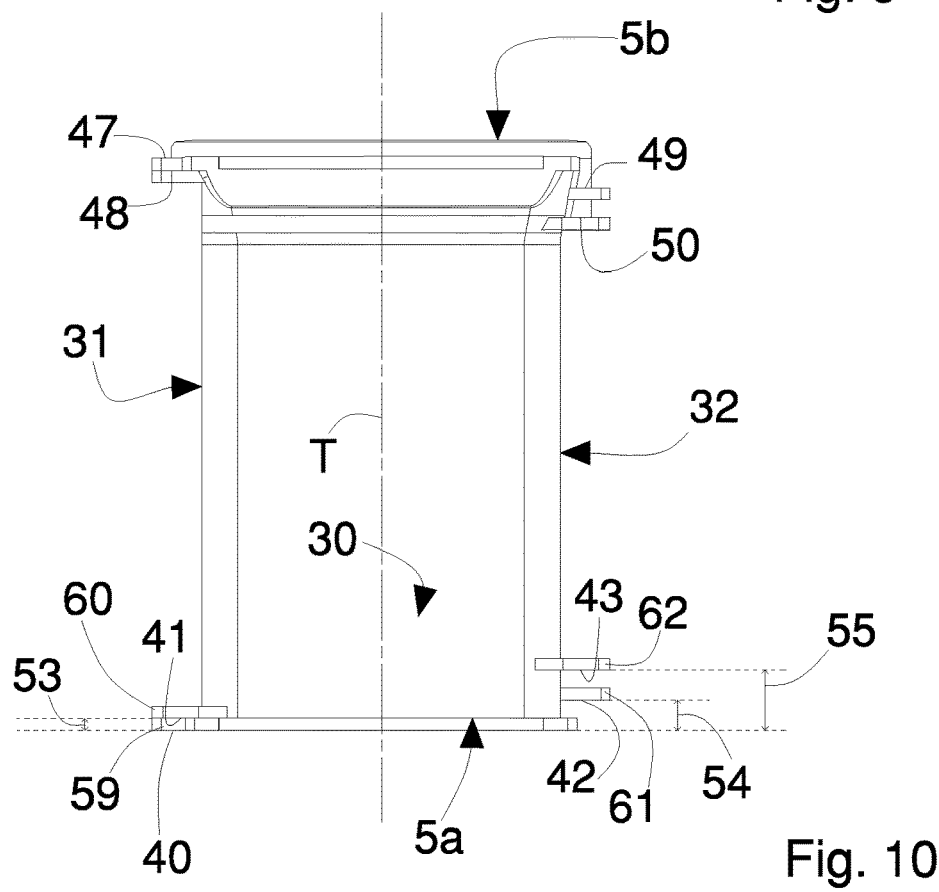
FIG. 10 is a top view of the forming pocket of FIGS. 3 to 9.

Advantageously, the first calibration distance, the second calibration distance 53, the third calibration distance 54 and the fourth calibration distance 55 are different from one another, as highlighted in FIG. 10.

It should be noted that, in the particular conformation of the pocket 5 of FIG. 10, the first calibration distance is equal to zero, i.e. the first outline surface 33 and the first calibration surface 40 are coplanar.

The calibration surfaces 40, 41, 42 and 43 are part of respective wings 59, 60, 61 and 62 that project from the lesser lateral faces 31 and 32 and are staggered along the longitudinal axis T of the forming pocket 5. In order for the first calibration surface 40 and the second calibration surface 41, and the third calibration surface 42 and the fourth calibration surface 43 to be in staggered pairs along the vertical axis V, the wings 59, 61 that comprise the first calibration surface 40 and the third calibration surface 42 are obviously of a lesser dimension along the vertical axis V with respect to the wings 60, 62, which comprise the second calibration surface 41 and the fourth calibration surface 43.

In use, by simultaneously performing a tridimensional scan of the first calibration surface 40 and of the second calibration surface 41 before, or afterwards, the tridimensional scan of the first head face 2a of the group 2, the processing device 8 can obtain two respective rectilinear calibration lines, because they derive from flat surfaces, which are usable as references of a first calibration distance and of a second calibration distance 53.

Owing to two different calibration lines that are indicative of two respective different calibration distances that are known a priori, the analysis of the tridimensional profile of the head face 2a of the group 2, based on the analysis, for each tridimensional scan, of the differences between a first ideal substantially linear scanning line (to check empty tips, for example) and the first actually acquired scanning line 13, can be checked and calibrated, for each pocket 5, simply and effectively.

Further, as the different calibration lines were acquired in the same lighting and installation conditions as each first scanning line 13, the processing device 8 is able to identify exactly how much a first scanning line 13 deviates from the ideal condition, having a priori two known distance references.

The calibration surfaces 40 to 43 are arranged at the lesser lateral faces 31, 32 of the pocket 5 and are parallel to the advancing direction D of the pocket 5 whereas the first shaped surface 28, arranged at the head face 2a of the group 2 of cigarettes 3 projects from the opposite side of the first greater lateral face 29 to the second greater lateral face 30 of the pocket 5.

As illustrated in FIGS. 3 to 14, the first front face 5a of the forming pocket 5 can comprise both the calibration surfaces from 40 to 43 and the first shaped surface 28, to have both greater precision in identifying the deviation of each first scanning line 13 and, further, to identify the reference position at the scanning instant of each first acquired scanning line 13.

It is nevertheless emphasized that it is possible to configure the forming pocket 5 with the first calibration surface 40 and the second calibration surface 41, and/or the third and the fourth calibration surface 42, 43 without necessarily configuring the forming pocket with the first shaped surface 28.

In fact, if only greater precision is required in identifying each first scanning line 13, the processing device 8 can use the cyclical advancing signals of the transporting conveyor 4 as shown in the prior already known documents and it is advantageous to configure the forming pocket 5 exclusively with the two calibration surfaces 40, 41 (or with the four calibration surfaces from 40 to 43 if desired).

On the other hand, if it is required to avoid precisely those cyclical advancing signals of the transporting conveyor 4, it is advantageous to set up the forming pocket 5 with the first shaped surface 28 and it is optional to configure the forming pocket 5 with the calibration surfaces 40 to 43.

Figure 15:
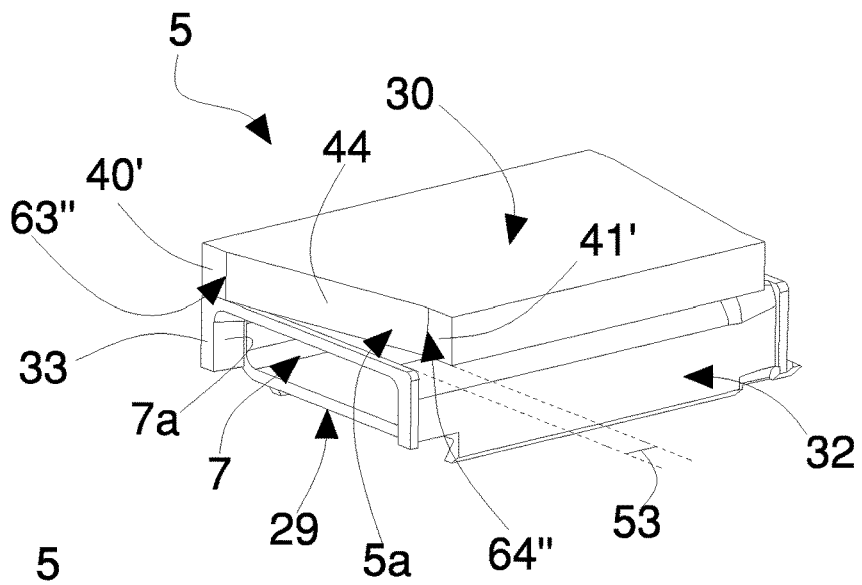
FIG. 15 is an axonometric view of another version of the forming pocket of FIG. 10, on the side of the first front face.
Figure 16:
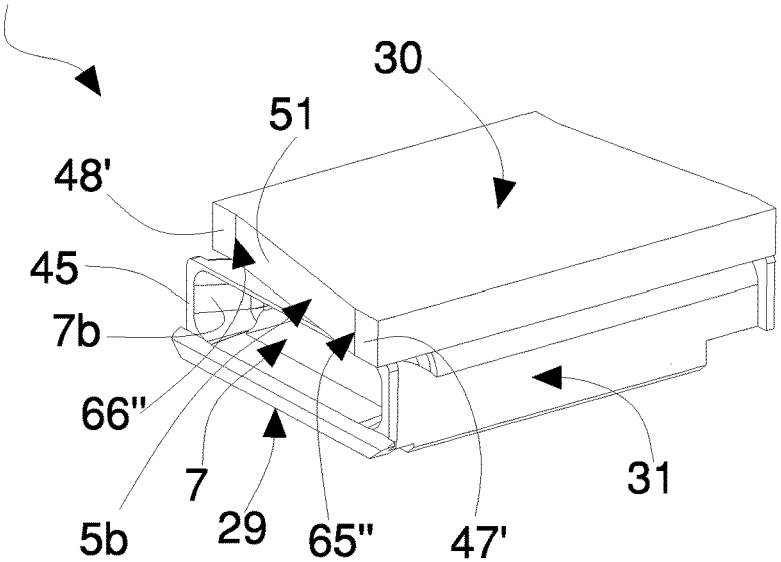
FIG. 16 is another axonometric view of the forming pocket of FIG. 15, on the side of the second front face.
Figure 17:
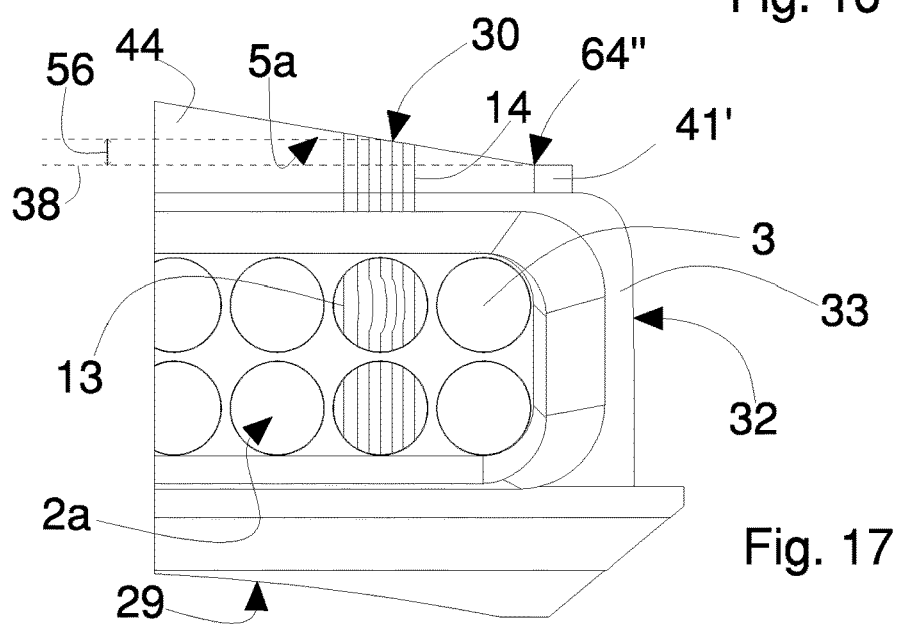
FIG. 17 is a magnification of the forming pocket of FIG. 15, with some parts removed for the sake of clarity, in which are shown a plurality of successive first group profiles and a plurality of corresponding first pocket profiles, as acquired in succession from the first optical apparatus of the first optical assembly.

According to a version illustrated in FIGS. 15 to 17, the forming pocket 5 comprises a first calibration surface 40' and a second calibration surface 41' that project beyond the first outline surface 33, on a side opposite the first greater lateral face 29. The first calibration surface 40' and the second calibration surface 41' are staggered not only with respect to the longitudinal axis of the pocket T but also with respect to the advancing direction D, they project from the second greater lateral face 30 and are arranged laterally on sides opposite the group 2 of elongated elements 3.

The optical device 8 is configured to obtain with a first tridimensional scan the first calibration line and to obtain with a second tridimensional scan the second calibration line, respectively before and after, the tridimensional scan of the head face 2a of the group 2.

According to this version, the first front face 5a comprises a respective first tilted surface 44 that is flat, connecting the first calibration surface 40' and the second calibration surface 41', which is placed at the group 2 of elongated elements 3, on the side of the second greater lateral face 30, and is at a variable pre-set distance, along the longitudinal axis T of the forming pocket 5, with respect to the first outline surface 33 being tilted with respect to the direction D.

It should be noted that the first outline surface 33 is in this case devoid of the rectilinear lateral edges but is only a surface, in particular a flat surface that surrounds the first mouth 7a. As said before, for the sole purpose of calibration, it is not necessary for the first outline surface 33 to be flat.

It should be noted that when a light blade illuminates a surface and the surface is a flat surface, the reflected luminous trace is a straight line segment.

The dimension of the straight line segment depends on the distance of the inspected surface with respect to the image acquisition optical apparatus. Thus if a first flat surface is at a lesser distance than another flat surface, by projecting a light blade onto the flat surfaces, segments of a different dimension will be obtained, i.e. respectively a first segment of greater dimension than a second segment, for the same positioning of the optical apparatus.

An inspected flat tilted surface with a light blade thus produces a succession of segments of different dimension, the dimension of which depends directly on the distance with respect to the optical apparatus, being inversely proportional to the distance itself. The set of segments is representable geometrically, overall, with a rectangular trapezium (FIG. 17).

If the first calibration surface 40' is then at a first calibration distance, which is less than a corresponding second calibration distance 53 (FIG. 15) at which the second calibration surface 41' is positioned, both measured from the first outline surface 33, the first calibration line is of a greater dimension than the second calibration line.

It should be noted that, in the particular conformation of the pocket 5 of FIG. 15, the first calibration distance is equal to zero, i.e. the first outline surface 33 and the first calibration surface 40' are coplanar.

As shown in FIG. 17, the first tridimensional optical assembly is further configured for performing simultaneously with each first tridimensional scan of the first head face 2a of the group 2 also a first tridimensional scan of the first tilted surface 44 to obtain, for each first scanning line 13, also a respective further scanning line 14 on the first tilted surface 44.

Despite the difference between the first shaped surface 28 (of a height that is linearly variable along the vertical direction V) and the first tilted surface 44 (at a depth that is linearly variable along the longitudinal axis T of the pocket 5), in both cases what has been said before applies, i.e. the processing device 8 is configured to calculate the respective first reference position of each first scanning line 13 by analyzing the respective further scanning line 14.

It should be noted that the first tilted surface 44 is a version of the first shaped surface and is similar to the first shaped surface 28 or 28', for the purposes of calculating each first reference position.

Also for this version of the first front face 5a of the forming pocket 5, it is possible to identify a first reference element with respect to which it is possible to identify the first reference position and the moment of the inspection. A first corner 63" is defined between the first calibration surface 40' and the first tilted surface 44, a second corner 64" is defined between the first tilted surface 44 and the second calibration surface 41'. Both the first corner 63" and the second corner 64" are parallel to the vertical axis V of the forming pocket 5 and are thus perpendicular to the advancing direction D and can be taken as reference elements with respect to which it is possible to calculate the first reference position.

Again, what has been said before applies, i.e. the first projector 15 is configured to project the first light blade 12 both onto the first head face 2a of the group 2 and in addition onto the first tilted surface 44 of the pocket 5, and the first optical apparatus 16 is arranged to frame both the first head face 2a of the group 2 and in addition the first tilted surface 44 of the pocket 5 and to acquire in the same first image (not illustrated) both the first head face 2a of the group 2 and the first tilted surface 44 of the pocket 5. The tridimensional scan of the first front face 2a of the group 2 and of the first front face 5a of the pocket 5, i.e. of the first tilted surface 44, are performed simultaneously.

In the case of the forming pocket of FIGS. 15 to 17, a third reference distance 56 has be calculated between an end of the further scanning line 14 and a respective reference line 38, that is horizontal, passing through an end of the lesser of first calibration line and the second calibration line, which is the case shown in FIG. 17 is the second calibration line.

In each tridimensional inspection, the first reference position (i.e. the distance of the first scanning line 13 for example from the first reference element 63"), is inversely proportional to the third reference distance 56.

It should be noted that the first tilted surface 44 is placed at a variable distance with respect to the outline surface 33 but that, as a priori the tilt is known of the first tilted surface 44 with respect to the longitudinal axis T and to the direction D at the moment of designing the forming pocket 5, each tridimensional scan of the first tilted surface 44 enables a respective further scanning line 14 to be obtained that also provides a distance reference, i.e. a depth indication, usable for evaluating possible deformations of each first scanning line 13 along the longitudinal axis T of the pocket 5 in addition to the first calibration line and to the second calibration line.

The first tilted surface 44 is also a calibration surface for the purposes of calibrating deviation along the longitudinal axis T.

It is observed that according to a version that is not illustrated, if it is not necessary to identify the reference position at the scanning instant of each first scanning line 13 acquired, the first tilted surface 44 can be absent.

The version of the forming pocket 5 shown in FIGS. 15 to 17 thus supplements in the first tilted surface 44 both the calibration function and the reference function.

Advantageously, owing to this version, the forming pocket 5 is so configured that the first calibration surface 40', the second calibration surface 41' and the first tilted surface 44 of the first front face 5a project beyond the outline surface 33 to the second greater lateral face 30 and it is possible to have a simple and compact forming pocket 5 that permits great precision in identifying each first scanning line 13 and further enables the cyclical advancing signals of the transporting conveyor 4 to be avoided. The analysis of the reference position of each first scanning line 13 and the evaluation of the calibration lines are performed simultaneously.

We have said previously that, for the purpose of inspecting both the head faces 2a, 2b of the group 2 of elongated elements 3, the transferring and inspection unit 1 comprises a first optical assembly, comprising the first projector 15 and the first optical apparatus 16, and a second optical assembly, comprising the second projector 23 and the second optical apparatus 24.

As illustrated in the attached figures, if in addition to the double inspection it is wished to reconstruct with precision both the first head face 2a of the group 2 and the second head face 2b and if further, for each tridimensional scan, the first scanning line 13 and the second scanning line are to be arranged in a respective first reference position and second reference position avoiding the cyclical advancing signals of the transporting conveyor 4; and if in addition precision is desired in the evaluation of each first scanning line 13 and of each second scanning line, then the forming pocket 5 has to be configured in such a manner that both the front faces 5a and 5b comprise respective shaped surfaces and respective calibration surfaces.

Figure 8:
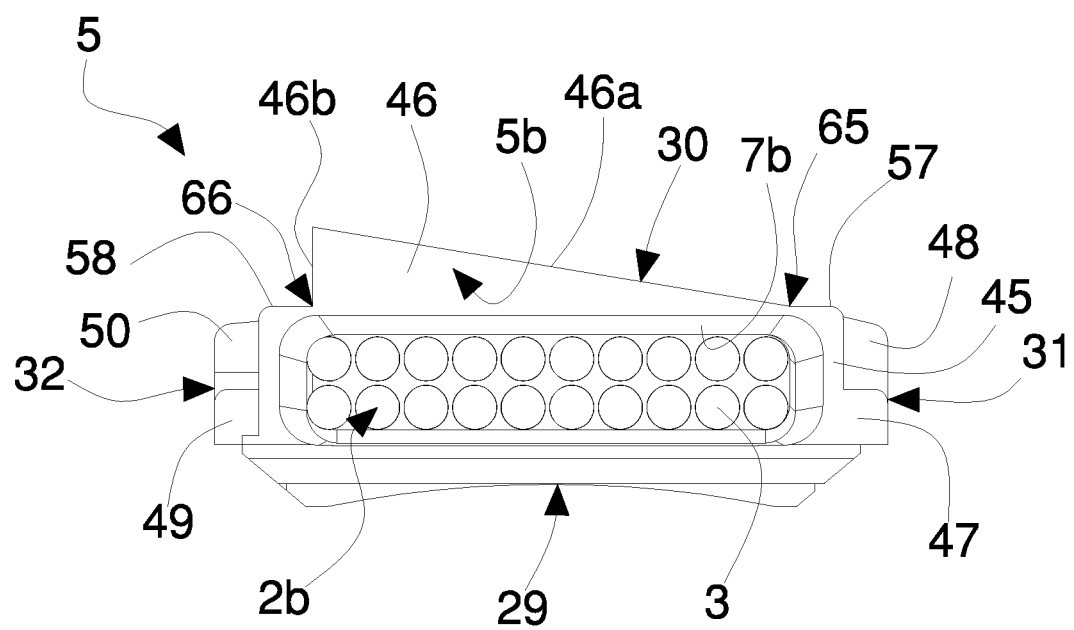
FIG. 8 is a front view of the forming pocket of FIG. 7, observed from the side of a second head face of the group in which ends containing filtering material are present.
Figure 12:
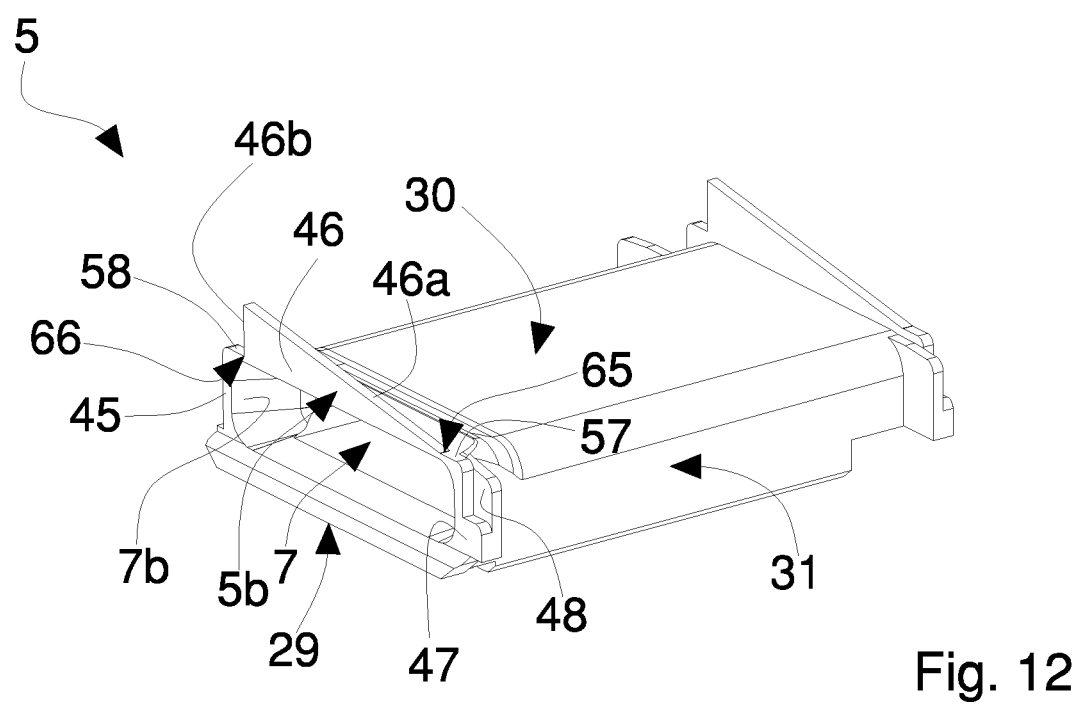
FIG. 12 is an axonometric view of the forming pocket of FIG. 10, observed from the side of the second front face.

In detail, as illustrated in FIGS. 8, 12 and 14, the second front face 5b comprises a second outline surface 45, that surrounds the second mouth 7b and is flat, a respective first shaped surface 46, arranged between a respective first lateral edge 57 and second lateral edge 58, and a respective first and second calibration surface 47 and 48. For the first shaped surface 46 and for the first calibration surface 47 and for the second calibration surface 48 of the second front face 5b everything that has been said before applies in relation to the first front face 5a, with the sole difference that the tridimensional scan of the second front face 5b is performed by the second projector 23 and the second optical apparatus 24.

In detail, the first shaped surface 46 can be configured as single right-angled triangle provided with a hypotenuse 46a and with a cathetus 46b connecting the first lateral edge 57 and the second lateral edge 58, or can be configured as a saw tooth 46', provided with a plurality of triangles, each identifiable by a respective hypotenuse 46'a and by a cathetus 46'b.

What has been said before applies, i.e. the second reference element, with respect to which each second reference position is defined, can be for example a first corner 65 (or 65') and a second corner 66 (or 66') defined respectively between the first lateral edge 57 and the hypotenuse 46a and the cathetus 46b and the second lateral edge 58 (or between the first lateral edge 57 and the first hypotenuse 46'a of the first triangle of the saw tooth and the last cathetus 46'b of the last triangle of the saw tooth and the second lateral edge 58). Both the first corner 65 (or 65') and the second corner 66 (or 66') are parallel to the longitudinal axis T of the forming pocket 5 and thus perpendicular to the advancing direction D.

Optionally, the second front face 5b can also comprise also a third and a fourth calibration surface 49, 50 if the forming pocket is configured as in FIGS. 3 to 14 (in particular in FIG. 10). Again, everything that has been said before in relation to the third and to the fourth calibration surface 42, 43 of the first front face 5a of the pocket 5 applies.

It has been said that the version of the forming pocket 5 shown in FIGS. 15 to 17 differs from the forming pocket 5 of FIGS. 3 to 14 through the presence in the first front face 5a of the first tilted surface 44, which is tilted with respect to the longitudinal axis of the pocket T and connecting the first calibration surface 40' and the second calibration surface 41', that are flat, that are perpendicular to the longitudinal axis of the pocket T and project to the second greater lateral face 30 of the pocket 5.

Similarly, in this version, the second front face 5b comprises a respective second flat tilted surface 51, connecting a respective first calibration surface 47' and a second calibration surface 48', which is placed at the group 2 of elongated elements 3, on the side of the second greater lateral face 30, and is at a pre-set variable distance, along the longitudinal axis T of the forming pocket 5, with respect to the second outline surface 45 being tilted with respect to the direction D.

It should be noted that the first calibration surface 40' and the second calibration surface 41' of the first front face 5a are displaced at the respective first calibration distance and second calibration distance 53.

It can be further noted that the first calibration distance and the second calibration distance of the second front face 5b, at which the respective first calibration surface 47' and second calibration surface 48' are arranged, are different from the first calibration distance and second calibration distance 53 of the first front face 5a. In this manner, simultaneously inspecting the first front face 5a and the second front face 5b, the precision can be further improved in the evaluation of the possible deviation of the first scanning line 13 or of the second scanning line.

It is added that the second tilted surface 51 has the same function as the second shaped surface 46 (or 46') for the purposes of identifying of the second reference position in the reconstruction of the second tridimensional profile of the second head face 2b of the group 2 and for the purposes of calibration.

The second reference position will be calculated with respect to the second reference element that, in this case can be a first corner 65" between the first flat calibration surface 47' and the second tilted surface 51 or a second corner 66" between the second tilted surface 51 and the second flat calibration surface 48'.

Simultaneously with each second tridimensional scan of the second head face 2b of the group 2, the optical assembly can in fact also perform a respective second tridimensional scan of the second tilted surface 51 to obtain, for each second scanning line, also a respective still further scanning line onto the second tilted surface 51 by means of which to calculate the second reference distance.

Further, as the second tilted surface 51 is a depth that is linearly variable along the longitudinal axis T of the pocket 5 and as a priori the tilt is known of the second tilted surface 51 with respect to longitudinal axis T and to the direction D at the moment of the design of the forming pocket 5, each tridimensional scan of the second tilted surface 51 enables a respective still further scanning line to be obtained that also provides a distance reference, i.e. a depth indication, which is usable for evaluating possible deformations of each second scanning line along the longitudinal axis T of the pocket 5 in addition to the first calibration line and to the second calibration line of the respective first calibration surface 47' and second calibration surface 48' of the second front face 5b.

The invention claimed is:

1. A transferring and inspection unit of a group of elongated elements that are rod-shaped for smoking articles, including:

a forming pocket, having a longitudinal axis, which is provided with a hollow housing suitable for housing a group of elongated elements to be inspected;

a transporting conveyor of the forming pocket which is configured to advance the pocket along an advancing path through a first inspection position, including:

a first tridimensional inspecting optical assembly configured to perform in successive scanning instants a plurality of first tridimensional optical scans by projecting a first light blade over a first head face of the group, during the advancing of the pocket through the first inspection position;

a processing device configured to obtain, for each first tridimensional scan, a respective first scanning line associated with the respective scanning instant and to reconstruct a first tridimensional profile of the first head face based on the plurality of the first scanning lines obtained, in which each scanning line is positioned in the first tridimensional profile in a respective first reference position indicating a corresponding zone of the first head face of the group inspected at the scanning instant, and in which the pocket having a first front face that includes a first shaped surface; and in which moreover the first optical assembly is configured to perform simultaneously with each first tridimensional scan of the first head face also a respective first tridimensional scan of the first shaped surface to obtain a respective further scanning line; and the processing device is in addition configured to calculate the reference position of each first scanning line analyzing the respective further scanning line.

2. The transferring and inspection unit according to claim 1, wherein the first optical assembly includes a first projector of the first light blade and a first optical apparatus for a 3D profile, and in which the first projector is configured to project the first light blade over the first head face and over the first shaped surface of the first front face, and the first optical apparatus is arranged to frame the first head face and the first shaped surface and to acquire in the same first image both the first head face and the first shaped surface such that the first optical assembly can simultaneously perform the tridimensional scan of the first head face of the groups and of the first shaped surface of the first front face.

3. The transferring and inspection unit according to claim 2, and in which moreover the first optical assembly further includes at least one respective first optical deflector suitable for generating a first virtual mirror plane of the first image, and optionally also a second optical deflector suitable for generating a second virtual mirror plane of the first image when the first image is reflected by the first optical deflector, such that the first optical apparatus can acquire the first image from the first optical deflector, or optionally from the second optical deflector, however the first optical apparatus is arranged with respect to the pocket.

4. The transferring and inspection unit according to claim 3, and in which moreover the first projector is arranged to project the first light blade parallel to the longitudinal axis of the pocket and perpendicularly to an advancing direction of the pocket, which is perpendicular to the longitudinal axis of the pocket, and in which the first optical apparatus has a first optical axis that is tilted with respect to the first light blade.

5. The transferring and inspection unit according to claim 1, wherein the pocket has an elongated substantially parallelpiped shape that extends along three directions that are mutually orthogonal to one another, a first direction defined by the longitudinal axis of the pocket, the remaining two directions being defined by an advancing direction of the pocket, which is orthogonal to the longitudinal axis and by a vertical direction, that is orthogonal to both the advancing direction of the pocket and the longitudinal axis of the pocket; and in which the pocket includes: a first greater lateral face, connected to the transporting conveyor; a first lesser lateral face, arranged downstream of a second lesser lateral face with respect to the advancing direction and in which the first front face includes a first outline surface that surrounds a first mouth of the hollow housing.

6. The transferring and inspection unit according to claim 5, and in which moreover the first outline surface is flat and perpendicular to the longitudinal axis of the pocket and in which the first front face comprises includes a first shaped surface that is flat, that is coplanar with the first outline surface, that projects from an opposite side of the first greater lateral face and is arranged at the group of elongated elements; and in which the first outline surface further includes a first lateral edge and a second lateral edge, which are rectilinear, parallel to the advancing direction and arranged outside the group on opposite sides of the first shaped surface; and in which the optical assembly is in addition configured to perform in succession at least one tridimensional scan of the first lateral edge to obtain a first edge scanning line that is rectilinear, perform the plurality of tridimensional scans of the first head face of the group and of the first shaped surface to obtain the first scanning lines and respective further straight scanning lines, and lastly perform at least one tridimensional scan of the second lateral edge to obtain a second rectilinear edge scanning line.

7. The transferring and inspection unit according to claim 6, wherein the first shaped surface is configured as a right-angled triangle, provided with a tilted edge constituting the hypotenuse of the right-angled triangle, which is the connection between the first lateral edge and the second lateral edge, and in which the processing device is suitable for calculating, for each tridimensional scan, a first reference distance between one end of the further scanning line and a reference line, in particular horizontal, joining respective edges of the first edge scanning line and of the second edge scanning line; the respective reference position of the first scanning line being directly proportional to the first reference distance.

8. The transferring and inspection unit according to claim 6, and in which the first shaped surface is configured as a saw tooth provided with a plurality of tilted edges constituting respective hypotenuses of right-angled triangles extending between the first lateral edge and the second lateral edge, and in which the processing device is suitable for associating an ordinal number with each saw tooth being inspected and calculating a second reference distance between one end of the further scanning line and a reference line, in particular horizontal, joining respective edges of the first edge scanning line and of the second edge scanning line, the first reference position being directly proportional to the second reference distance and to the ordinal number associated with the saw tooth being inspected.

9. The transferring and inspection unit according to claim 5, and in which moreover the first front face of the pocket includes:

a first calibration surface that is flat, that lies on a plane perpendicular to the longitudinal axis of the pocket and is arranged at a first preset calibration distance from the first outline surface of the first mouth;

a second calibration surface that is flat, parallel to the first calibration surface and staggered in relation thereto along the longitudinal axis, which is arranged at a second calibration distance that is preset with respect to the first outline surface;

and in which the first optical assembly is in addition configured to perform at least one first tridimensional scan of the first calibration surface and at least one second tridimensional scan of the second calibration surface to obtain respectively a first rectilinear calibration line and a second rectilinear calibration line, respectively associated with the first calibration distance and with the second calibration distance, which are usable by the processing device as references for evaluating possible deformations of each first scanning line along the longitudinal axis of the pocket.

10. The transferring and inspection unit according to claim 9, wherein the first calibration surface and the second calibration surface are arranged laterally on the same side of the pocket towards a lesser lateral face and outwardly with respect to the lateral edge of the outline surface facing the same lesser lateral face, for example the first lesser lateral face and outwardly with respect to the first lateral edge, and are staggered in relation to one another in the vertical direction; and in which the optical assembly is in addition configured to obtain with the same tridimensional scan the first calibration line and the second calibration line, before or after, the tridimensional scan of the lateral edge.

11. The transferring and inspection unit according to claim 10, and in which moreover the first front face includes:
a third calibration surface that is flat, arranged at a third calibration distance that is preset with respect to the first outline surface and that lies on a plane perpendicular to the longitudinal axis of the pocket;
a fourth calibration surface that is flat, arranged at a fourth calibration distance that is preset with respect to the first outline surface, parallel to the third calibration surface and staggered in relation thereto along the longitudinal axis;
and in which the third calibration surface and the fourth calibration surface are arranged laterally on the same side of the pocket towards the other lesser lateral face and outwardly with respect to the lateral edge of the outline surface facing the other lesser lateral face, and are staggered in relation to one another in the vertical direction; and in which the optical assembly is in addition configured to obtain with the same further tridimensional scan respectively a third calibration line and a fourth calibration line, respectively associated with the third calibration distance and with the fourth calibration distance, which are also usable as further references for evaluating possible deformations of each first scanning line along the longitudinal axis of the pocket.

12. The transferring and inspection unit according to claim 11, wherein the first calibration distance, the second calibration distance, the third calibration distance and the fourth calibration distance are different from one another.

13. The transferring and inspection unit according to claim 9, wherein the first calibration surface and the second calibration surface project beyond the first outline surface on an opposite side to the to the first greater lateral face, are staggered with respect to the advancing direction and are arranged laterally on opposite sides to the group of elongated elements; and in which the first front face includes a respective first tilted surface, which is a connection between the first calibration surface and the second calibration surface, is placed at the group of elongated elements and is at a variable distance, along the longitudinal axis of the pocket, with respect to the first outline surface being tilted with respect to the advancing direction, and in which the optical assembly is configured to obtain with the first tridimensional scan the first calibration line and with the second tridimensional scan the second calibration line, respectively before or after, a tridimensional scan of the first head face of the group.

14. The transferring and inspection unit according to claim 13, and in which the first calibration surface is arranged at a first calibration distance, which is less than a second calibration distance at which the second calibration surface is arranged, both the calibration distances being measured from the first outline surface, to obtain the first calibration line of a greater dimension than the second calibration line; and in which the processing device is suitable for calculating a third reference distance between one end of the further scanning line and a reference line that is horizontal, passing through an end of the second calibration line, the first reference position being inversely proportional to the third reference distance.

15. The transferring and inspection unit according to claim 13 and in which the first tilted surface is tilted in a preset manner with respect to the longitudinal axis, each further scanning line being associate with a different distance reference and being usable for evaluating possible deformations of each first scanning line along the longitudinal axis of the pocket in addition to the first calibration line and to the second calibration line.

16. The transferring and inspection unit according to claim 1 and further including:
a second tridimensional inspecting optical assembly configured to perform in respective successive scanning instants a plurality of second tridimensional optical scans projecting a second light blade onto a second head face of the group, opposite the first head face, during advancing of the forming pocket through a second inspection position;
in which the processing device is configured to obtain, for each respective second tridimensional scan, a respective second scanning line of elongated elements associated with the respective scanning instant; the processing device being further configured to reconstruct a second tridimensional profile of the second head face of the group on the basis of the plurality of second scanning lines, positioned in respective second reference positions;
and in which the forming pocket includes a second front face opposite the first front face, which includes a respective first shaped surface, the second optical assembly being further configured to perform simultaneously, for each second optical tridimensional scan of the second head face of the group, also the tridimensional scan of the first shaped surface of the second front face of the pocket, to obtain a respective still further scanning line, and in that the processing device is configured to calculate, in each respective scanning instant, the reference position of the second scanning line by analyzing the respective still further scanning line.

17. A transferring and inspection unit of a group of elongated elements that are rod-shaped for smoking articles, including:
a forming pocket, having a longitudinal axis, which is provided with a hollow housing suitable for housing a group of elongated elements to be inspected and in that it is provided with a first mouth;
a transporting conveyor of the pocket which is configured to advance the pocket along an advancing path through a first inspection position including:

a first tridimensional inspecting optical assembly configured to perform in respective successive scanning instants a plurality of first tridimensional optical scans by projecting a first light blade over a first head face of the group, during the advancing of the pocket through the first inspection position;

a processing device configured to obtain, for each first tridimensional scan, a respective first scanning line and to reconstruct a first tridimensional profile of the first head face on the basis of the plurality of the first scanning lines obtained, wherein each scanning line is positioned in the first tridimensional profile in a respective first reference position indicating a corresponding zone of the first head face of the group inspected at the scanning instant;

and in which the pocket having a first front face that includes a first flat calibration surface, that lies on a plane perpendicular to the longitudinal axis of the pocket and is arranged at a first preset calibration distance from a first outline surface of the first mouth; a second calibration surface that is flat, parallel to the first calibration surface and staggered in relation thereto along the longitudinal axis, which is at a preset second calibration distance from the first outline surface;

and in which the first optical assembly is in addition configured to perform at least one first tridimensional scan of the first calibration surface and a second tridimensional scan of the second calibration surface to obtain respectively a first rectilinear calibration line and a second rectilinear calibration line respectively associated with the first calibration distance and with the second calibration distance, which are used as references by the processing device to evaluate possible deformations of each scanning line along the longitudinal axis of the pocket.

18. The transferring and inspection unit according to claim 17, wherein the forming pocket has an elongated substantially parallelpiped shape that extends along three directions that are mutually orthogonal to one another, a first direction defined by the longitudinal axis of the pocket, the remaining two directions being defined by an advancing direction of the pocket, which is orthogonal to the longitudinal axis and by a vertical direction, that is orthogonal to both the advancing direction of the pocket and the longitudinal axis of the pocket; and in which the forming pocket includes: a first greater lateral face, connected to the transporting conveyor; a first lesser lateral face, arranged downstream of a second lesser lateral face with respect to the advancing direction.

19. The transferring and inspection unit according to claim 18, and in which the first outline surface is flat and is perpendicular to the longitudinal axis of the pocket; and in which the first calibration surface and the second calibration surface are arranged laterally on the same side of the pocket towards a lesser lateral face and externally with respect to the outline surface, and are further staggered in relation to one another in the vertical direction; and in which the optical assembly is in addition configured to obtain with the same tridimensional scan the first calibration line and the second calibration line, before or after, the tridimensional scan of the first head face of the group.

20. The transferring and inspection unit according to claim 19, and in which moreover the first front face further includes:

a third calibration surface that is flat, arranged at a third calibration distance that is preset with respect to the first outline surface and that lies on a plane perpendicular to the longitudinal axis of the pocket;

a fourth calibration surface that is flat, arranged at a fourth calibration distance that is preset with respect to the first outline surface, parallel to the third calibration surface and staggered in relation thereto along the longitudinal axis;

and in which the third calibration surface and the fourth calibration surface are arranged laterally on the same side of the pocket towards the other lesser lateral face and externally with respect to the outline surface and are staggered in relation to one another in the vertical direction; and in which the optical assembly is in addition configured to obtain with the same further tridimensional scan respectively a third calibration line and a fourth calibration line, respectively associated with the third calibration distance and with the fourth calibration distance, which are also usable as further references for evaluating the possible deformations of each first group profile line along the longitudinal axis of the pocket.

21. The transferring and inspection unit according to claim 20, wherein the first calibration distance, the second calibration distance, the third calibration distance and the fourth calibration distance are different from one another.

22. The transferring and inspection unit according to claim 18, wherein the first calibration surface and the second calibration surface project beyond the first outline surface on an opposite side to the first greater lateral face, are staggered with respect to the advancing direction and are arranged laterally on opposite sides to the group of elongated elements; and in which the optical assembly is configured to obtain with the first tridimensional scan the first calibration line and with the second tridimensional scan the second calibration line, before or after, the tridimensional scan of the first head face of the group.

23. The transferring and inspection unit according to claim 22, and in which the first front face includes a first tilted surface that is flat, which is a connection between the first calibration surface and the second calibration surface, is placed at the group of elongated elements on the side opposite the first greater lateral face and is at a variable distance, along the longitudinal axis of the pocket, with respect to the first outline surface being tilted with respect to the advancing direction, and in which the tridimensional optical assembly is further configured to perform simultaneously, for each tridimensional optical scan of the first head face of the group, also the tridimensional scan of the first tilted surface of the pocket, to obtain in addition a further scanning line on the first tilted surface.

24. The transferring and inspection unit according to claim 23, and in which the first tilted surface is placed at a variable distance that is preset with respect to the outline surface and each further scanning line is usable for evaluating possible deformations of each scanning line along the longitudinal axis of the pocket in addition to the first calibration line and to the second calibration line.

25. A transferring and inspection unit of a group of elongated elements that are rod-shaped for smoking articles, a forming pocket, having a longitudinal axis, which is provided with a hollow housing suitable for housing a group of elongated elements to be inspected;

a transporting conveyor of the pocket which is configured to advance the pocket along an advancing path through a first inspection position;

a first tridimensional inspecting optical assembly configured to perform in respective successive scanning instants a plurality of first tridimensional optical scans by projecting a first light blade over a first head face of the group, during advancing of the forming pocket through the first inspection position;

a processing device configured to obtain, for each first tridimensional scan, a respective first scanning line and to reconstruct a first tridimensional profile of the first head on the basis of the plurality of the first scanning lines, each of which is positioned in a respective first reference position indicating a corresponding zone of the first head face of the group inspected at the respective scanning instant; wherein the unit further includes:

a second tridimensional inspection optical assembly configured to perform in respective successive scanning instants a plurality of second tridimensional optical scans by projecting a second light blade onto a second head face of the group, opposite the first head face, during the advancing of the pocket through a second inspection position; and in which the processing device is configured to obtain for each second tridimensional scan, a respective second scanning line and to reconstruct a second tridimensional profile of the second head face of the group on the basis of the plurality of the second scanning lines, each of which is positioned in a respective first reference position indicating a corresponding zone of the second head face of the group inspected at the respective scanning instant.

26. The transferring and inspection unit according to claim 25, wherein the first optical assembly includes a first projector of the first light blade and a first optical apparatus for a 3D profile, and in which the first projector is configured to project the first light blade at least on the first head face of the group, and the first optical apparatus is arranged to frame at least the first head face of the group to acquire in a first image the first head face of the group; and in which the second optical assembly comprises includes a second projector of the second light blade and a second optical apparatus for a 3D profile, and in which the second projector is configured to project the second light blade at least on the second head face of the group, and the second optical apparatus is arranged to frame at least the second head face of the group to acquire in a second image the second head face of the group.

27. The transferring and inspection unit according to claim 26, and in which moreover the first optical assembly further includes a respective first optical deflector suitable for generating a first virtual mirror plane of the first image, and optionally also a second optical deflector suitable for generating a second virtual mirror plane of the first image when the first image is reflected by the first deflector, such that the first optical apparatus can acquire the first image from the first optical deflector, or optionally from the second optical deflector, however the first optical apparatus is arranged with respect to the forming pocket; and in which moreover the second optical assembly further comprises includes respectively at least one respective further first optical deflector, suitable for generating a first virtual mirror plane of the second image, and optionally also a further second optical deflector, suitable for generating a second virtual mirror plane of the second image when the second image is reflected by the respective first optical deflector, such that the second optical apparatus can acquire the second image from the respective further first optical deflector, or optionally form the further second optical deflector, however the second optical apparatus is arranged with respect to the second head face of the group.

28. The transferring and inspection unit according to claim 26, and in which moreover the first projector and the second projector are arranged to project the first light blade and the second light blade parallel to the longitudinal axis of the pocket and perpendicularly to an advancing direction of the pocket; and in which moreover the first optical apparatus has a first optical axis that is tilted with respect to the first light blade and the second optical apparatus has a second optical axis that is tilted with respect to the second light blade.

29. The transferring and inspection unit according to claim 25, and in which moreover the first inspection position and the second inspection positioner are aligned along an advancing direction perpendicular to the longitudinal axis of the pocket, the first light blade being substantially coplanar with the second light blade.

30. The transferring and inspection unit according to claim 2, wherein the pocket has an elongated substantially parallelpiped shape that extends along three directions that are mutually orthogonal to one another, a first direction defined by the longitudinal axis of the pocket, the remaining two directions being defined by an advancing direction of the pocket, which is orthogonal to the longitudinal axis and by a vertical direction, that is orthogonal to both the advancing direction of the pocket and the longitudinal axis of the pocket; and in which the pocket includes: a first greater lateral face, connected to the transporting conveyor; a first lesser lateral face, arranged downstream of a second lesser lateral face with respect to the advancing direction and in which the first front face includes a first outline surface that surrounds a first mouth of the hollow housing.

31. The transferring and inspection unit according to claim 6, and in which moreover the first front face of the pocket includes:

a first calibration surface that is flat, that lies on a plane perpendicular to the longitudinal axis of the pocket and is arranged at a first preset calibration distance from the first outline surface of the first mouth;

a second calibration surface that is flat, parallel to the first calibration surface and staggered in relation thereto along the longitudinal axis, which is arranged at a second calibration distance that is preset with respect to the first outline surface;

and in which the first optical assembly is in addition configured to perform at least one first tridimensional scan of the first calibration surface and at least one second tridimensional scan of the second calibration surface to obtain respectively a first rectilinear calibration line and a second rectilinear calibration line, respectively associated with the first calibration distance and with the second calibration distance, which are usable by the processing device as references for evaluating possible deformations of each first scanning line along the longitudinal axis of the pocket.

* * * * *